Feb. 23, 1960 L. C. BURNS ET AL 2,925,847
MACHINE FOR FORMING PISTON RINGS FROM STRIP STOCK
Filed Sept. 19, 1957 13 Sheets-Sheet 1

INVENTORS
LEO C. BURNS, JELTE BOUWMAN
& VERN H. BATHRICK
BY
Barnes, Kisselle, Raisch & Choate
ATTORNEYS Feb. 23, 1960 L. C. BURNS ET AL 2,925,847
MACHINE FOR FORMING PISTON RINGS FROM STRIP STOCK
Filed Sept. 19, 1957 13 Sheets-Sheet 2

FIG. 3-A

INVENTORS
LEO C. BURNS, JELTE BOUWMAN
& VERN H. BATHRICK
BY
Barnes, Kisselle, Raisch & Choate
ATTORNEYS

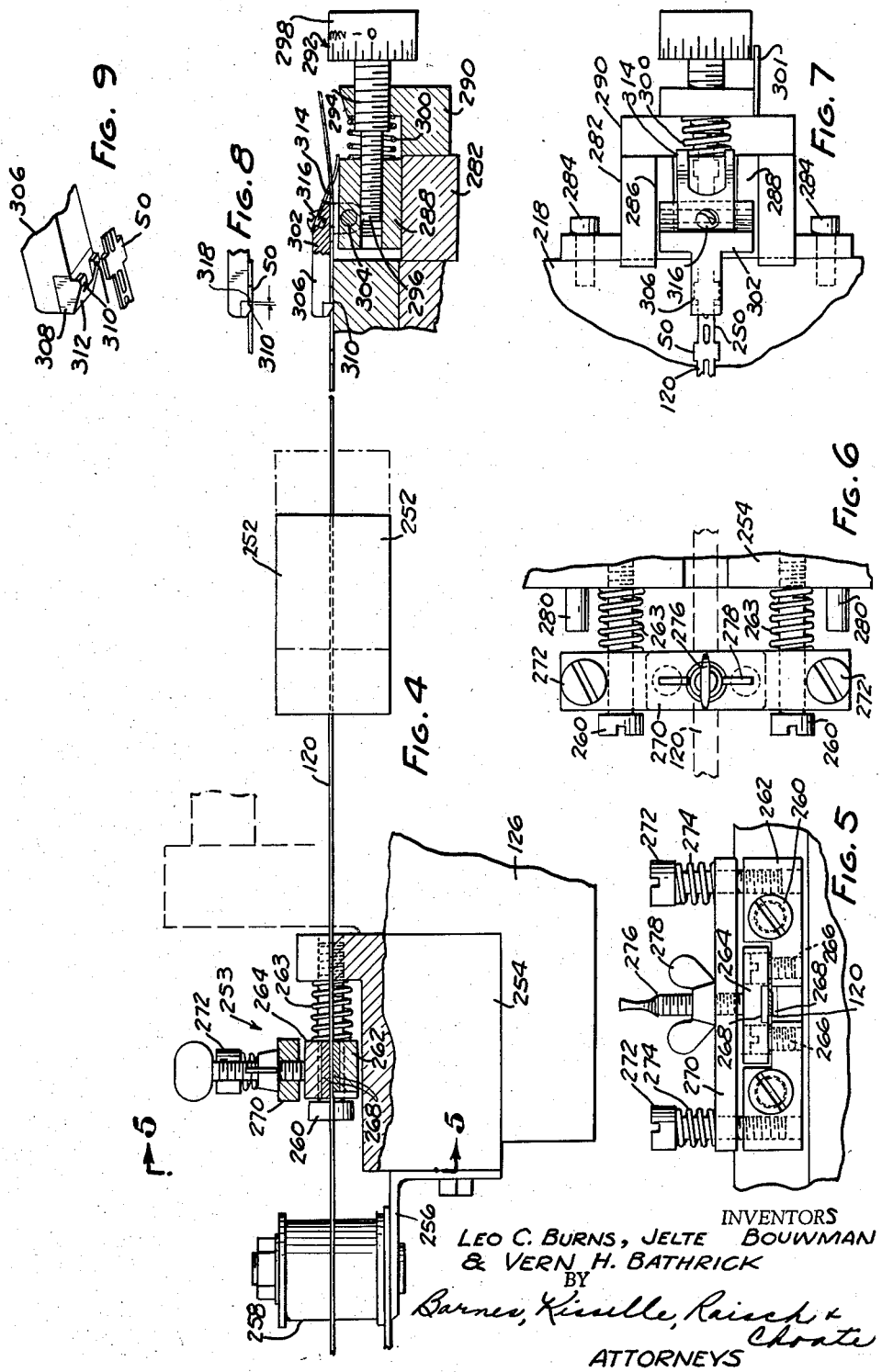

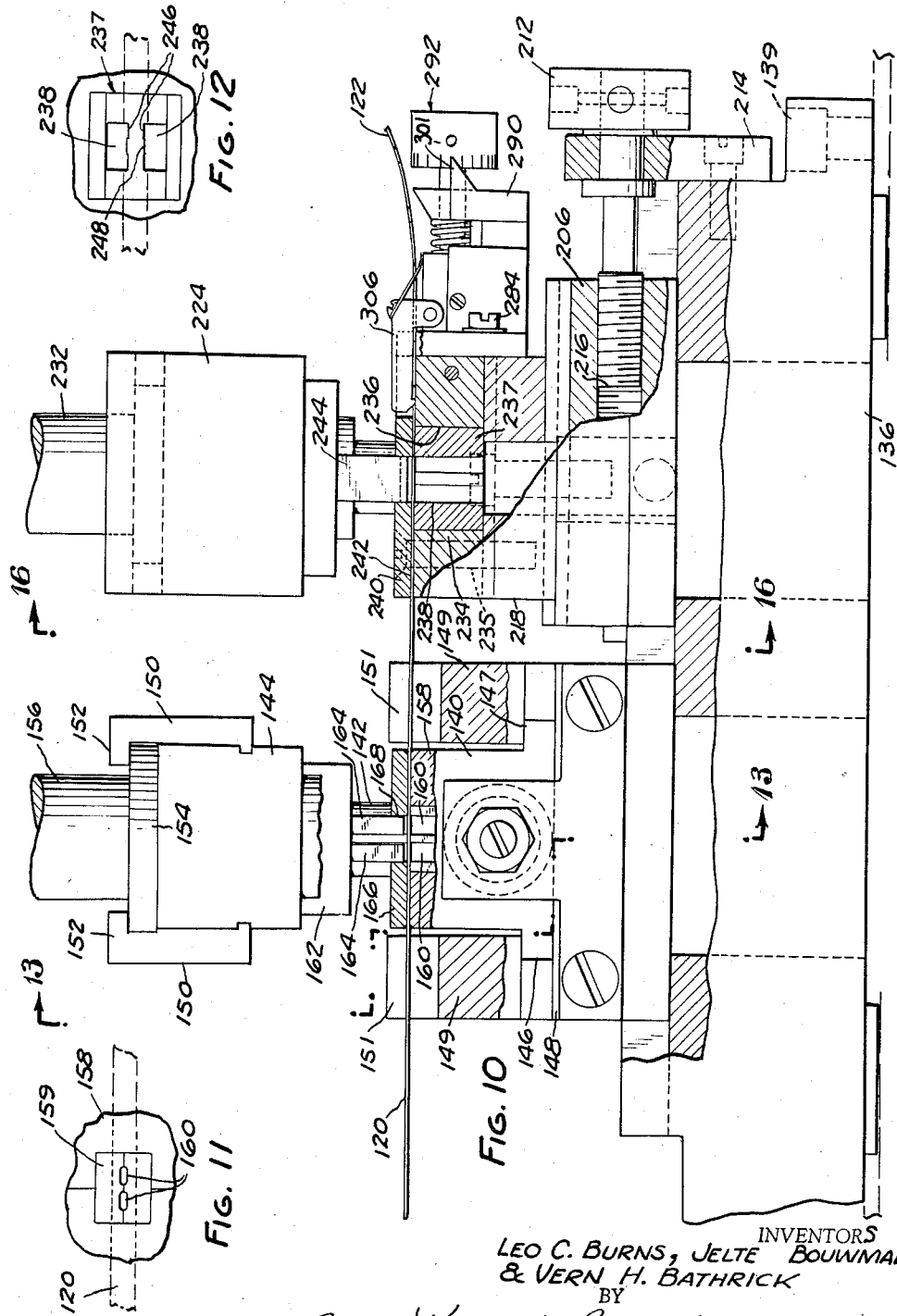

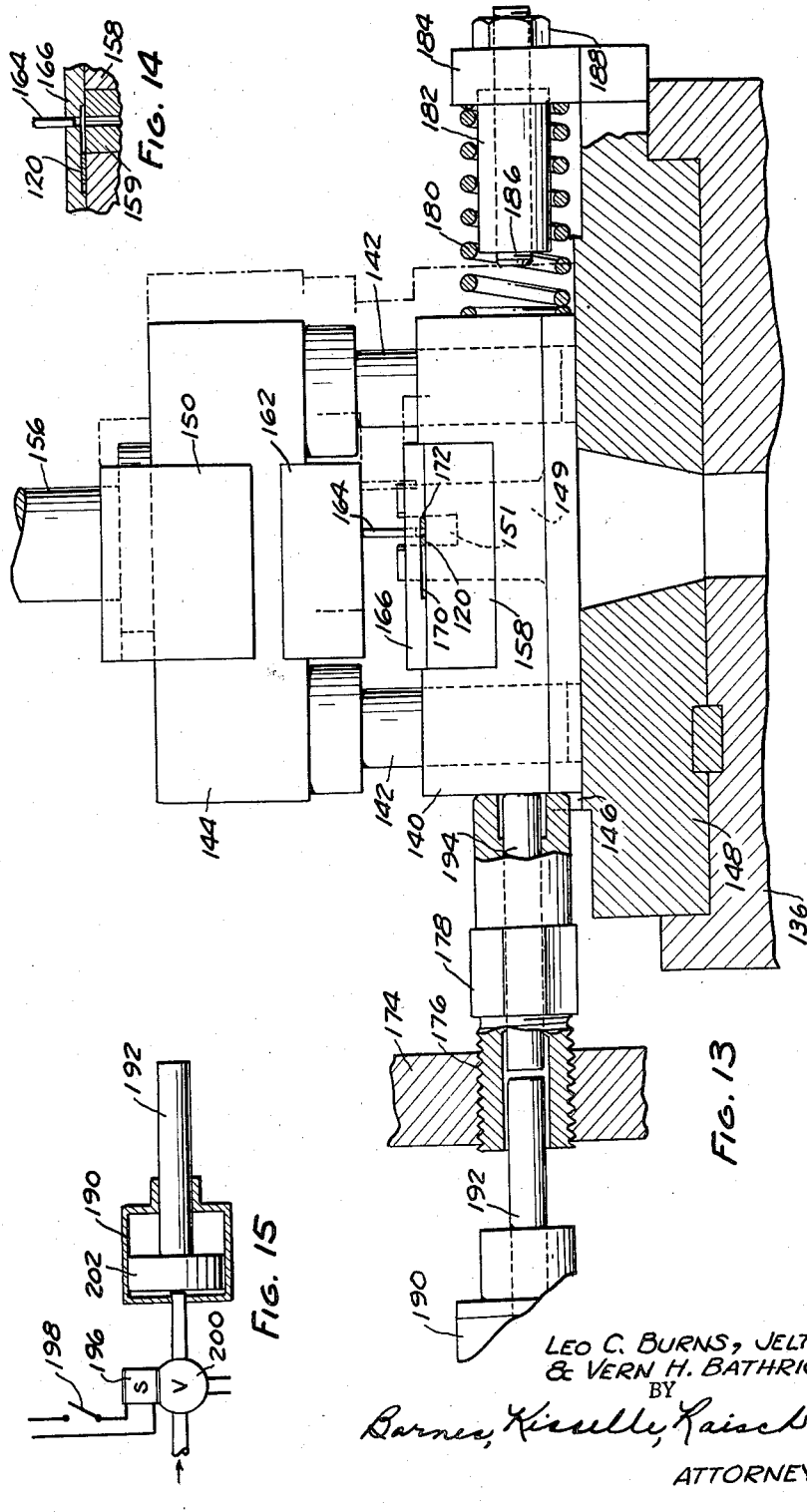

Feb. 23, 1960     L. C. BURNS ET AL     2,925,847
MACHINE FOR FORMING PISTON RINGS FROM STRIP STOCK
Filed Sept. 19, 1957     13 Sheets-Sheet 6
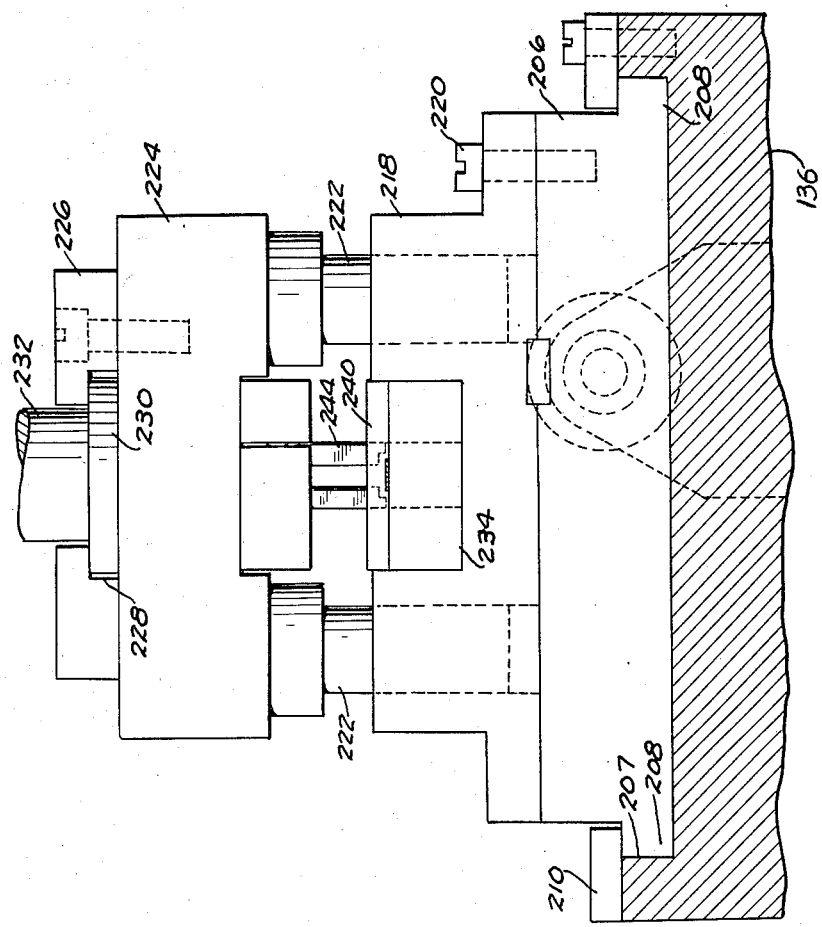
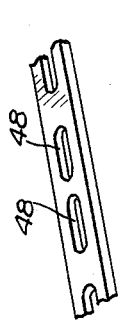
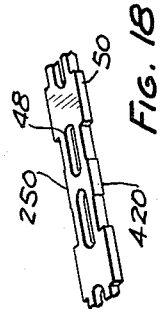
INVENTORS
LEO C. BURNS, JELTE BOUWMAN
& VERN H. BATHRICK
BY
Barnes, Kisselle, Raisch & Choate
ATTORNEYS Feb. 23, 1960 L. C. BURNS ET AL 2,925,847
MACHINE FOR FORMING PISTON RINGS FROM STRIP STOCK
Filed Sept. 19, 1957 13 Sheets-Sheet 7

INVENTORS
LEO C. BURNS, JELTE BOUWMAN
& VERN H. BATHRICK.
BY
Barnes, Kisselle, Raisch & Choate
ATTORNEYS Feb. 23, 1960 L. C. BURNS ET AL 2,925,847
MACHINE FOR FORMING PISTON RINGS FROM STRIP STOCK
Filed Sept. 19, 1957 13 Sheets-Sheet 8
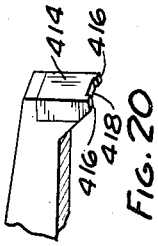
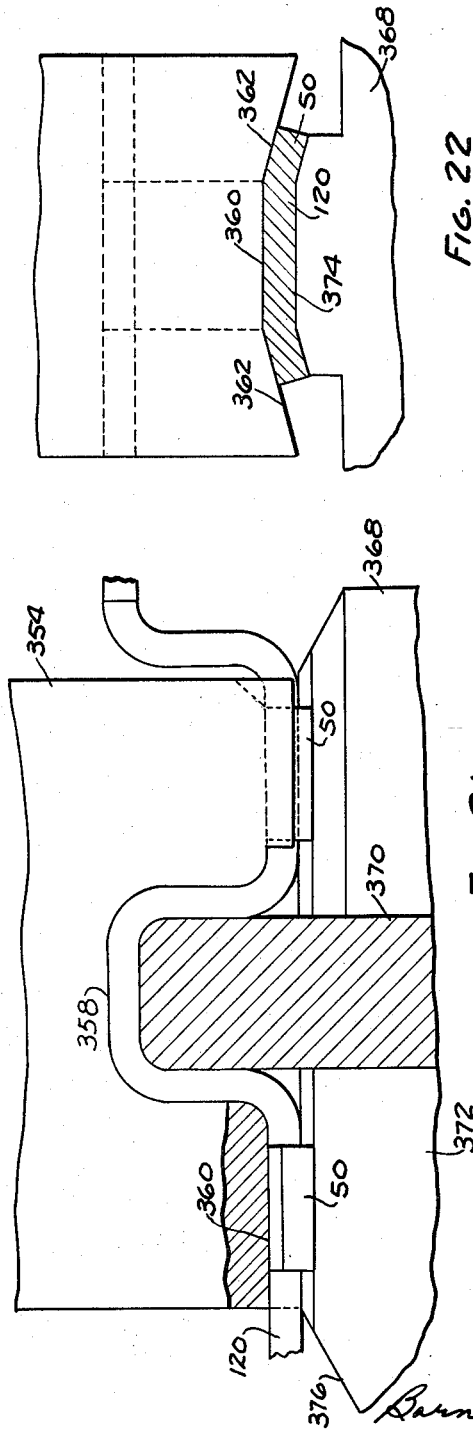
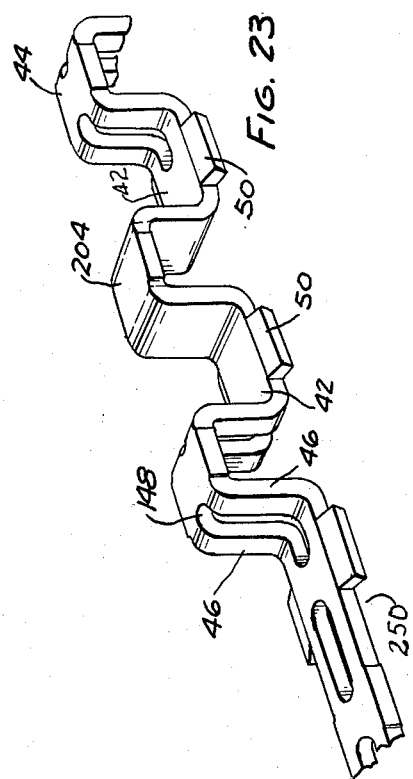
INVENTORS
LEO C. BURNS, JELTE BOUWMAN
& VERN H. BATHRICK.
BY
ATTORNEYS Feb. 23, 1960   L. C. BURNS ET AL   2,925,847
MACHINE FOR FORMING PISTON RINGS FROM STRIP STOCK
Filed Sept. 19, 1957   13 Sheets-Sheet 9
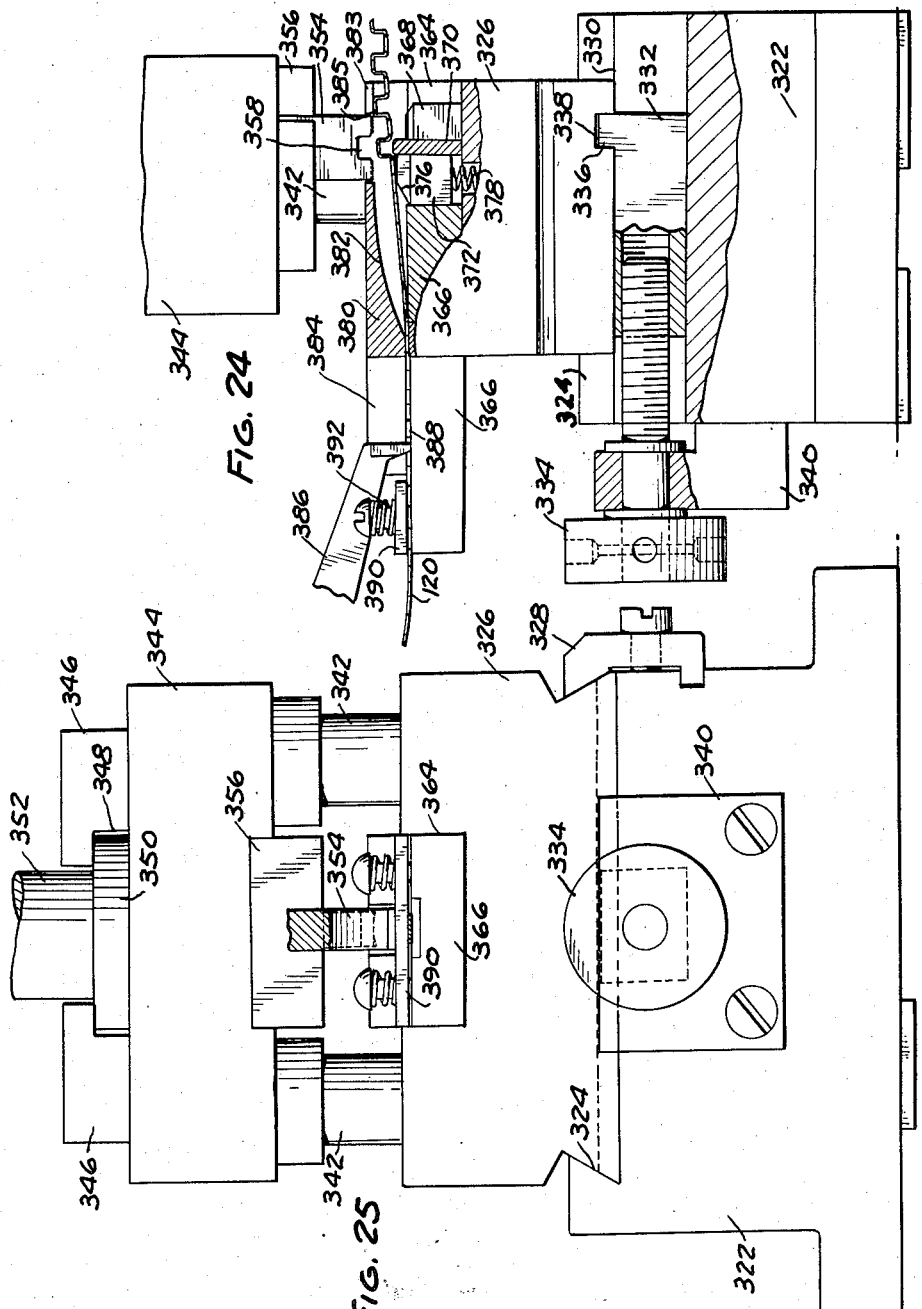
INVENTORS
LEO C. BURNS, JELTE BOUWMAN
& VERN H. BATHRICK
BY
Burns, Kiselle, Raisch & Choate
ATTORNEYS Feb. 23, 1960 L. C. BURNS ET AL 2,925,847
MACHINE FOR FORMING PISTON RINGS FROM STRIP STOCK
Filed Sept. 19, 1957 13 Sheets-Sheet 10
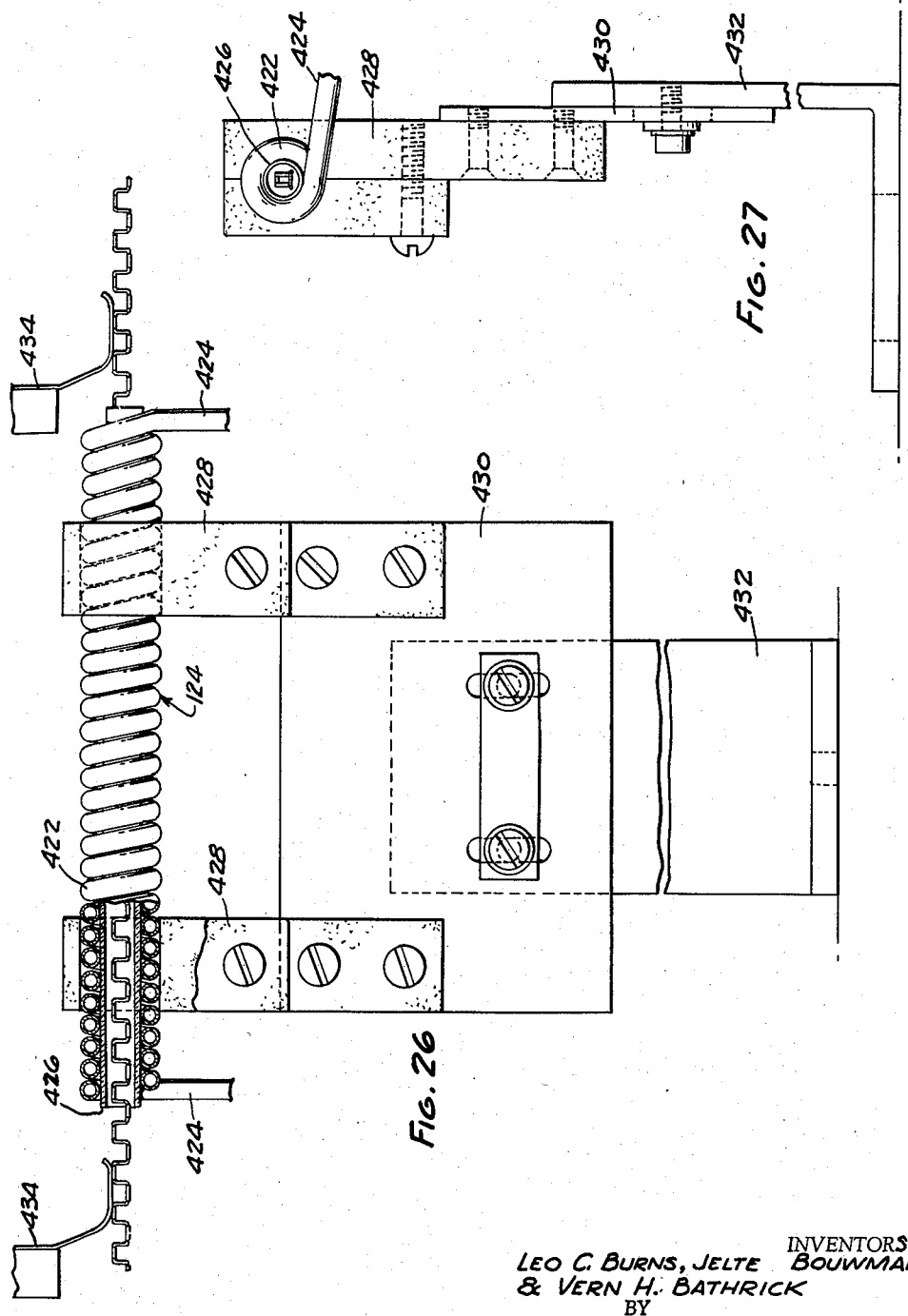
INVENTORS
LEO C. BURNS, JELTE BOUWMAN
& VERN H. BATHRICK
BY
ATTORNEYS Feb. 23, 1960     L. C. BURNS ET AL     2,925,847
MACHINE FOR FORMING PISTON RINGS FROM STRIP STOCK
Filed Sept. 19, 1957     13 Sheets-Sheet 11
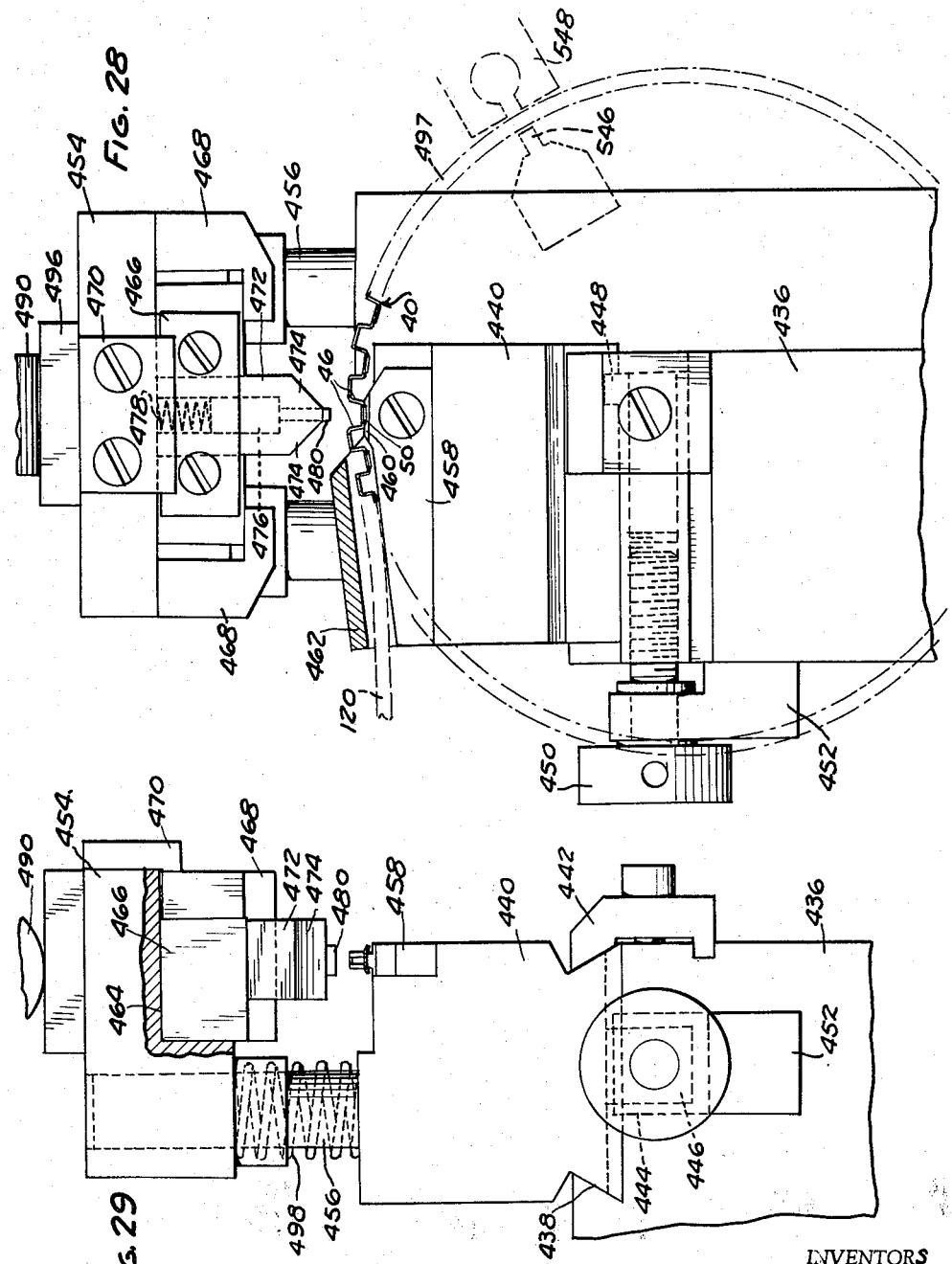
INVENTORS
LEO C. BURNS, JELTE BOUWMAN
& VERN H. BATHRICK
BY
Barnes, Kisselle, Raisch & Choate
ATTORNEYS

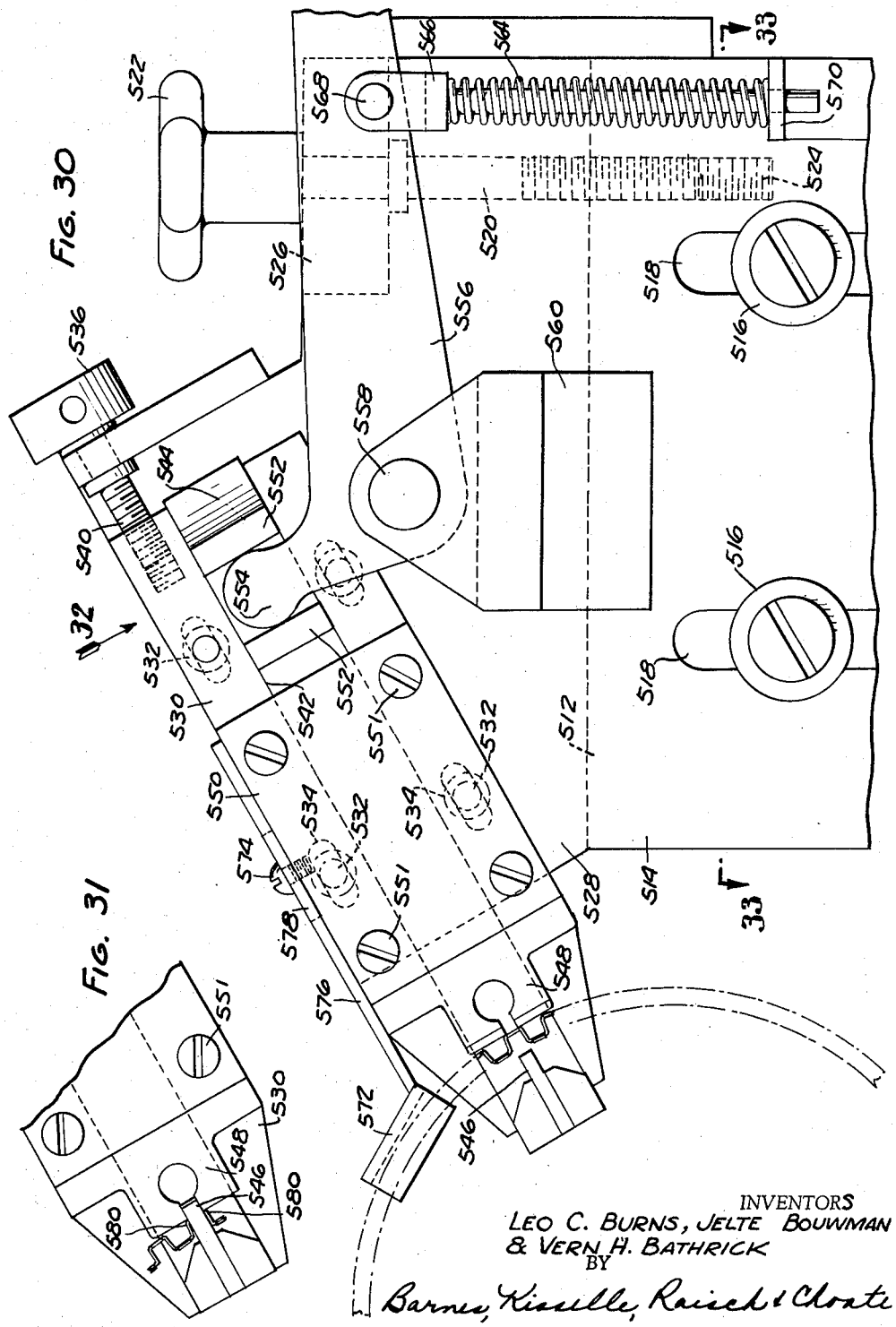

Feb. 23, 1960 L. C. BURNS ET AL 2,925,847
MACHINE FOR FORMING PISTON RINGS FROM STRIP STOCK
Filed Sept. 19, 1957 13 Sheets-Sheet 13

INVENTORS
LEO C. BURNS, JELTE BOUWMAN
& VERN H. BATHRICK
BY
Barnes, Kisselle, Raisch & Choate
ATTORNEYS United States Patent Office 2,925,847
Patented Feb. 23, 1960

2,925,847

MACHINE FOR FORMING PISTON RINGS FROM STRIP STOCK

Leo C. Burns, Jelte Bouwman, and Vern H. Bathrick, Muskegon, Mich., assignors to Sealed Power Corporation, Muskegon, Mich., a corporation of Michigan Application September 19, 1957, Serial No. 684,998

41 Claims. (Cl. 153—7)

This invention relates generally to a punch press and particularly to an apparatus for punching metal in the form of a strip and forming such punched strip into rings.

More specifically the invention has to do with an apparatus for forming in a single continuous operation flat ribbon strip stock into expander and spacer rings of the type commonly located between thin metallic rails in the oil grooves of a piston of an internal combustion engine.

The object of this invention is to enable production of such rings economically and at a high rate.

The apparatus of the present invention is characterized by its ability to produce rings of the type described to very close tolerances and at a relatively high rate. In general the apparatus comprises a punch press having a plurality of stations through which strip stock is fed progressively in accurately predetermined increments, the strip stock being worked between dies at each station to transform the strip stock into completed rings. The press includes one or more punching stations where the strip stock is pierced and notched, a forming station where the pierced and notched strip is corrugated, a coiling station where the corrugated stock is fashioned into a coil and a cut-off station where each coil is sheared from the strip to form the finished ring. The press also includes a heat treating station between the forming station and the coiling station for relieving the stresses produced in the strip by the cold forming operation.

The strip feed mechanism is constructed to permit very accurate control and adjustment of the length of the feed stroke. In addition, at least some of the dies are mounted on the press for adjustment in a direction lengthwise of the strip fed through the press so that adjustment of the feed stroke and of the relative positions of the dies enables production of rings of different diameters without the necessity of changing dies.

Other features and advantages of the apparatus of this invention will become apparent from the following description and drawings.

Figure 3:
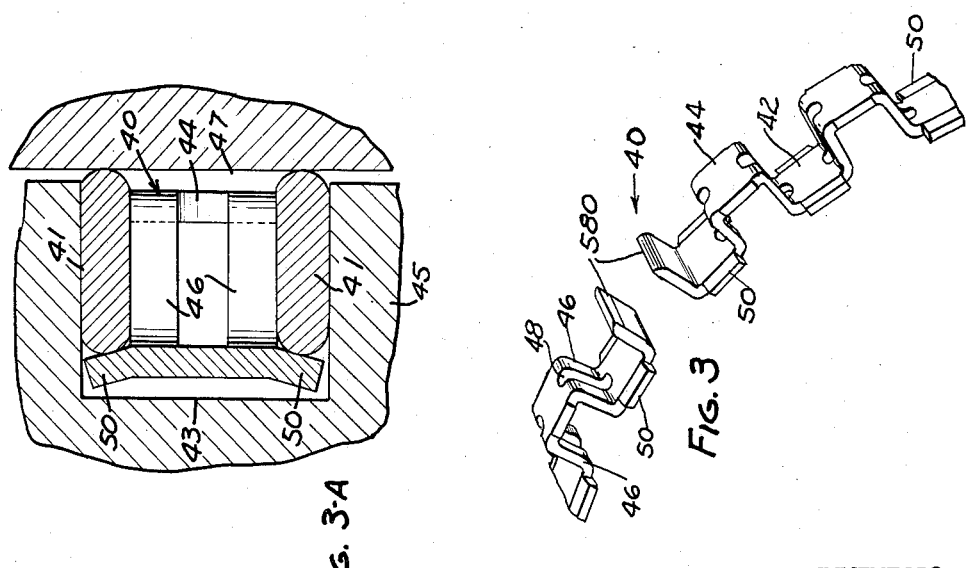
Fig. 3 is a fragmentary perspective view of an expander ring formed with a machine of the present invention.

Fig. 3-A is a fragmentary sectional view showing the manner in which the ring is arranged in the oil groove of a piston.

Fig. 4 is a fragmentary view, partly in section and partly diagrammatic, showing the feed control mechanism of the machine.

Fig. 5 is a sectional view taken along the line 5—5 in Fig. 4 showing the spring return feed brake.

Fig. 6 is a top plan view of the feed brake shown in Fig. 5.

Fig. 7 is a top plan view of the feed control pawl mechanism shown in Fig. 4.

Fig. 8 is a fragmentary side elevational view and Fig. 9 is a fragmentary perspective view showing the operation of the feed control pawl.

Fig. 10 is a fragmentary side elevational view on an enlarged scale with parts broken away and showing the piercing and notching die assemblies of the machine.

Fig. 11 is a fragmentary plan view of the piercing die.

Fig. 12 is a fragmentary plan view of the notching die.

Fig. 13 is a sectional view taken generally along the line 13—13 in Fig. 10.

Fig. 14 is a fragmentary sectional view of a portion of the piercing punch and die illustrated in Fig. 13 with the parts shifted to a different position.

Fig. 15 is a diagrammatic view illustrating generally the shuttle mechanism for shifting the die assembly illustrated in Fig. 13.

Fig. 16 is a sectional view taken generally along the line 16—16 in Fig. 10.

Figs. 17 and 18 are fragmentary perspective views showing the operations performed on the strip material at the two die assemblies illustrated in Fig. 10.

Figure 19:
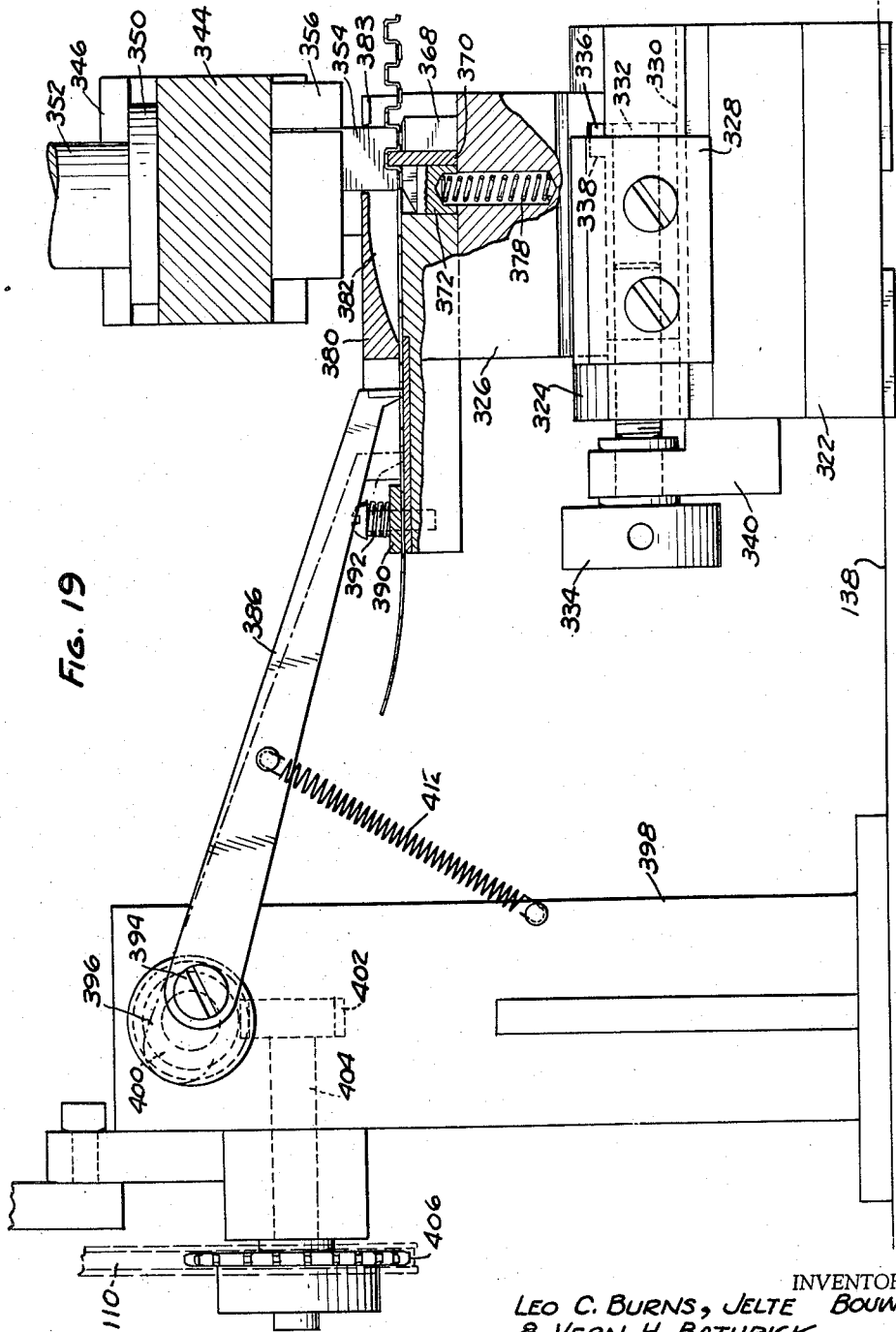

Fig. 19 is a side elevational view on an enlarged scale and with parts broken away showing the auxiliary feed mechanism and the die apparatus for crimping or corrugating the strip material that has been previously pierced and notched.

Fig. 20 is a fragmentary perspective view of the end of the feed pawl shown in Fig. 19.

Fig. 21 is an enlarged fragmentary view of a portion of the corrugating die arrangement shown in Fig. 19.

Fig. 22 is an end view of the arrangement illustrated in Fig. 21.

Fig. 23 is a fragmentary perspective view of the corrugated strip.

Fig. 24 is a side elevational view, partly in section and on an enlarged scale, and corresponding to the corrugating die assembly illustrated in Fig. 19 but showing the punch in the raised position.

Fig. 25 is an end view of the arrangement shown in Fig. 24.

Fig. 26 is a side elevational view, partly in section, of the induction heater assembly on the machine.

Fig. 27 is an end view of the heater assembly shown in Fig. 26.

Fig. 28 is a side elevational view, partly in section, showing the die arrangement for forming the corrugated strip into a coil.

Fig. 29 is an end view of the die arrangement illustrated in Fig. 28.

Fig. 30 is a fragmentary side elevational view on an enlarged scale of the cut-off mechanism.

Fig. 31 shows the cut-off punch illustrated in Fig. 30 in a different position.

Figure 32:
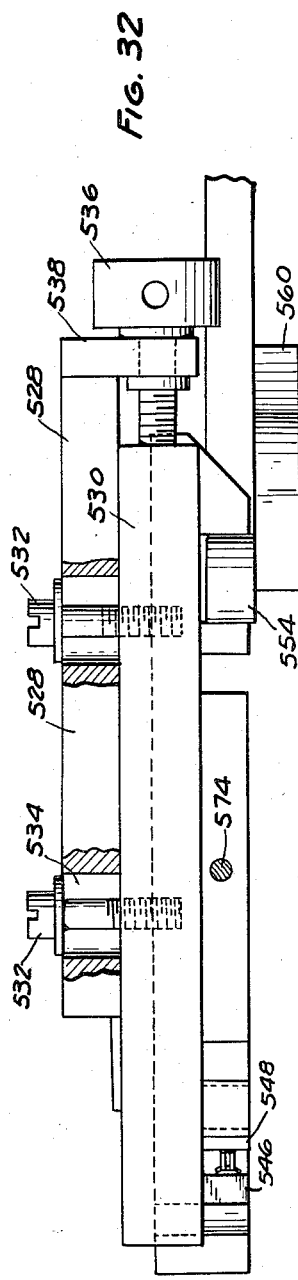

Fig. 32 is a top plan view of a portion of the mechanism illustrated in Fig. 30 as viewed in the direction of the arrow 32 with the cover plate and guide arm removed.

Figure 33:
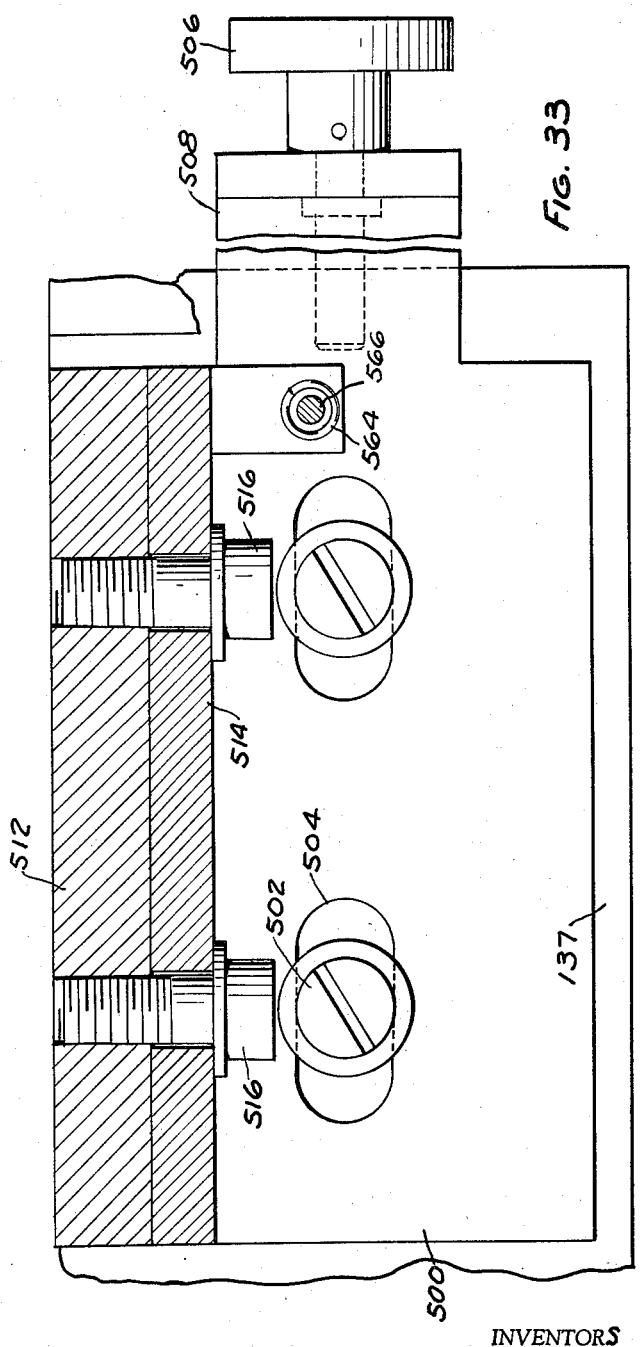

Fig. 33 is a sectional view taken along the line 33—33 in Fig. 30.

For the purposes of the description and not by way of limitation, the machine is illustrated with the proper dies for forming the piston ring spacer and expander illustrated in the patent to Olson, 2,789,872, dated April 23, 1957. This spacer and expander ring 40 (Fig. 3) comprises a member generally circular in outline and formed with a plurality of alternate inward and outward corrugations 42 and 44. These corrugations or humps are connected by radial legs 46 arranged in pairs, the legs in each pair being separated by a vent opening 48. The inward corrugations 42 are provided at each side thereof with lugs 50 inclined slightly in a direction radially inward of the ring.

The machine of the present invention is designed to form the ring 40 with the corrugations 42, 44, openings 48 and lugs 50 in a single continuous operation from strip steel.

In use ring 40 is arranged between upper and lower rails 41 in the oil groove 43 of a piston 45. Lugs 50 engage the inner edges of rails 41 and bias the rails outwardly against the cylinder wall 47 (Fig. 3–A).

General arrangement

Figure 1:
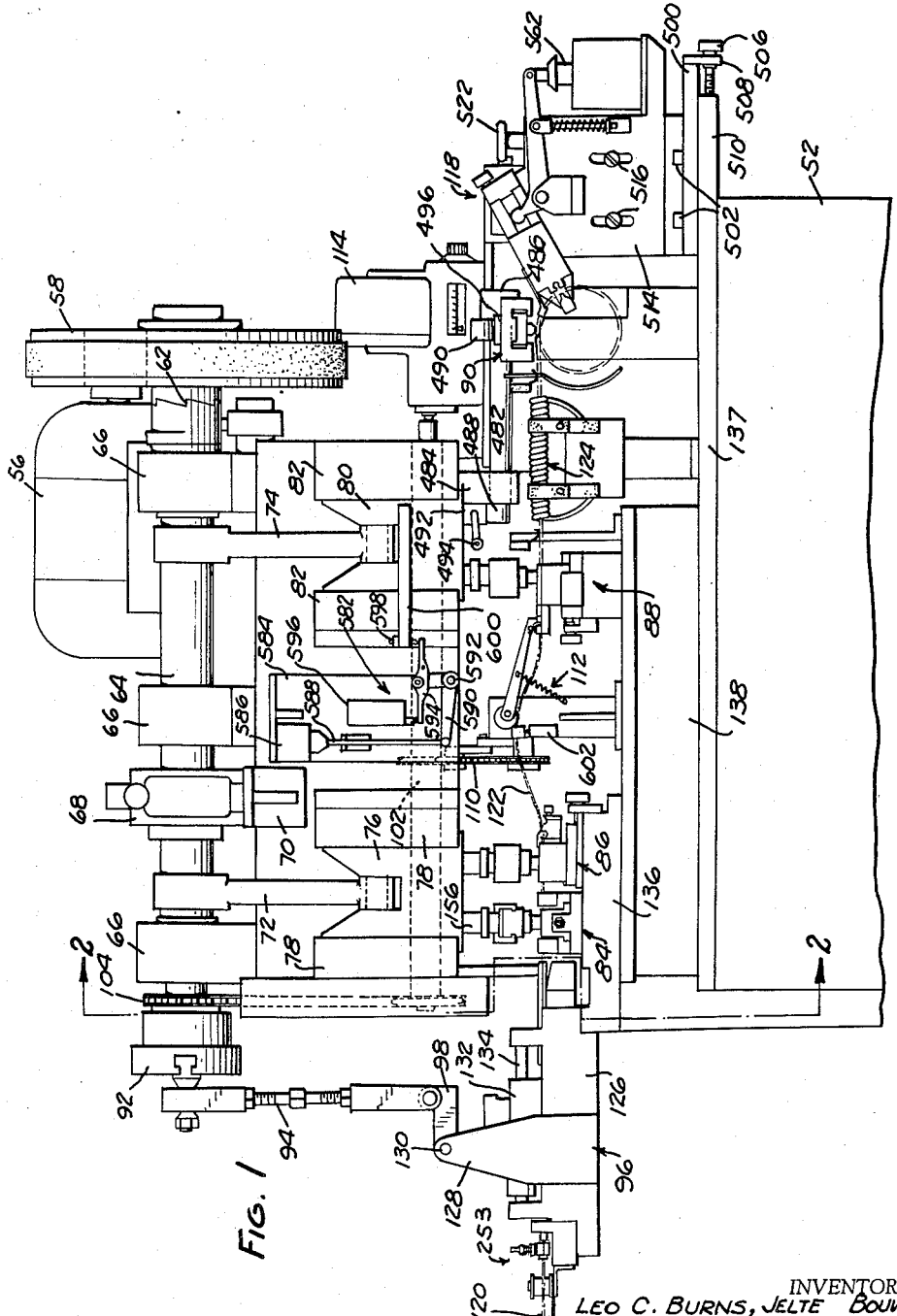
Fig. 1 is a fragmentary front elevational view of the machine of the present invention.
Figure 2:
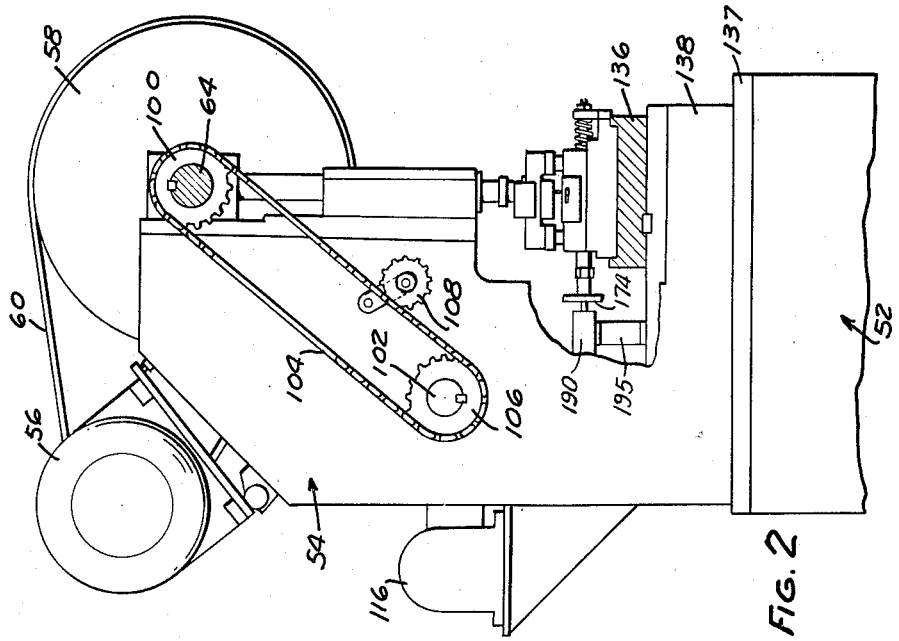
Fig. 2 is a sectional view of the machine taken along the line 2—2 in Fig. 1.

Referring to Figs. 1 and 2, the machine of the present invention generally consists of a punch press having a base 52 which supports a frame 54. A motor 56 on frame 54 drives a flywheel 58 through a belt 60. Flywheel 58 is connected by a clutch 62 with the crankshaft 64 of the press. Clutch 62 is of the positive drive, electric throwout type. Shaft 64 is journalled on the frame of the machine in bearings 66. A magnetic brake 68 is arranged around shaft 64 and mounted on a bracket 70. Brake 68 is electrically energized and is arranged to seize shaft 64 when the circuit to the brake is opened. Shaft 64 has two crank portions to which the upper ends of connecting rods 72 and 74 are pivotally connected. Connecting rod 72 is connected at its lower end with a ram 76 guided for vertical movement on the head structure of the machine in ways formed in guide plates 78. In a like manner a ram 80 is pivotally connected to the lower end of connecting rod 74 and is guided for vertical reciprocation in ways formed in guide plates 82.

In a manner which will be explained more fully hereinafter, ram 76 operates a piercing die assembly 84 and a notching die assembly 86. Ram 80 operates a corrugating die assembly 88 and a coiling punch assembly 90.

At the end of shaft 64 opposite flywheel 58 there is arranged a disk 92 to which a link 94 is eccentrically connected for driving a strip feeder 96 through a bell crank 98. A sprocket 100 is keyed to shaft 64 (Fig. 2). Sprocket 100 drives a countershaft 102 through a chain 104 and a sprocket 106 mounted on one end of the countershaft. An idler sprocket 108 is provided for taking up the slack in chain 104. A chain drive 110 from countershaft 102 drives an auxiliary feed mechanism 112. Countershaft 102 also drives a pair of Cyclo-monitors 114 and 116. These Cyclo-monitors are controls manufactured by Counter and Control Corporation of Milwaukee, Wisconsin. Their construction and operation are described in United States Patent 2,489,474 and Reissue Patent 23,461. For the purposes of this description it is suffice to say that these controls are arranged to produce an electrical impulse every predetermined number of revolutions of countershaft 102. They may be adjusted to vary the number of revolutions between successive impulses. Cyclo-monitor 114 controls the operation of a cut-off device 118 and Cyclo-monitor 116 controls the shuttling movement of the piercing die assembly 84. Countershaft 102 synchronizes the operation of the various mechanisms described generally and thus serves as a timing shaft.

In general the operation of the machine is as follows: Steel strip material 120, preferably stainless steel of the A.I.S.I. 201 or 301 type, is fed by the feeder 96 to the piercing die assembly 84 where the openings 48 are formed. The strip advances to the die assembly 86 where each side of strip 120 is notched at regularly spaced portions to form lugs 50. Thereafter, the strip material is caused to form a bow 122 and is again fed by the auxiliary feed mechanism 112 to the corrugating die assembly 88 where the strip is formed into the alternate corrugations 42, 44. The strip material then passes through an induction heater 124 to the coiling punch assembly 90 which transforms the corrugated strip into a coil. The cut-off mechanism 118 is operated intermittently by Cyclo-monitor 114 to shear the coiled strip into successive rings.

Main feed mechanism

Referring now to Fig. 1, the strip feeder 96 may be any standard unit conventionally employed for feeding strip stock intermittently by predetermined increments. The form of feeder shown in Fig. 1 is a slide type feeder produced by U.S. Tool Company of Ampere, New Jersey, the construction and operation of which is shown in United States Patents 1,959,953, 2,380,918, 2,397,833 and 2,569,108. For the purposes of this description, it suffices to say that feeder 96 includes a base 126 having side supports 128 to which the bell crank 98 is pivotally connected as at 130. Bell crank 98 is arranged to reciprocate a slide assembly 132 on guide pins 134. Slide assembly 132 includes a pair of separable jaw elements (not illustrated) for gripping the strip material 120 and advancing it through a distance corresponding to the stroke of slide 132. The strip is advanced first through the piercing die assembly 84 and then through the notching die assembly 86. These die assemblies are mounted on a bolster plate 136 which in turn is secured to the bed plate 138 by screws 139 (Fig. 10). Bed plate 138 is mounted on the table 137 of base 52.

Piercing die assembly

The piercing die assembly 84 (Figs. 10, 13 and 16) includes a lower shoe 140 provided with guide pins 142 on which an upper shoe 144 is guided for vertical movement. Lower shoe 140 is arranged in a guideway 146 formed in a slide 148 mounted on bolster plate 136. Guideway 146 extends in a direction perpendicular to the line of travel of strip 120. This guideway is defined in part by undercut shoulders 147 along the lower edges of a pair of upright guide blocks 149 fixedly mounted on slide 148 one adjacent each side face of lower die shoe 140. Guide blocks 149 are formed with aligned channel portions 151 for guiding the strip 120 through the die.

The upper shoe 144 has a pair of gib plates 150 projecting above the upper edge thereof. These gib plates are formed with inwardly projecting flanges 152 which form a guideway on the upper face of shoe 144 in which the lower flanged end 154 of a pin 156 is arranged. The upper end of pin 156 is threaded into ram 76 so that as the ram reciprocates vertically the upper die shoe 144 is caused to travel vertically on guide pins 142. The shut height of this piercing die can thus be controlled by threaded adjustment of pin 156 in ram 76. Lower die shoe 140 is provided with a socket in which is fixedly secured a die 158. A die insert 159 (Fig. 14) in die 158 is provided with through cavities 160. A punch holder 162 is mounted on upper die shoe 144 and supports a pair of punches 164. Punches 164 are designed to pierce the strip 120 to form the openings 48 therein (Figs. 17 and 23).

On the top face of die 158 there is secured a stripper plate 166 formed with guide openings 168 in which the lower ends of the punches 164 are slidably retained. The lower face of stripper plate 166 is formed with a relatively wide groove 170 which extends in a direction parallel to the direction of travel of strip 120 through the die. The longitudinal edge 172 of groove 170 is algined with the adjacent edge of strip 120 when the lower die is in the position illustrated by solid lines in Fig. 13. Groove 170 is of sufficient width to permit the whole die assembly to shift relative to strip 120 to the right to the position shown in Fig. 14 (shown also by broken lines in Fig. 13).

A fixed upright bracket 174 behind the punch assembly 84 is threaded as at 176 to receive an adjusting stop sleeve 178. Die shoe 140 is biased against the end of sleeve 178 by a spring 180. Spring 180 surrounds a sleeve 182 carried by a bracket 184 at the front end of slide or base plate 148. One end of spring 180 bears against the front face of die shoe 140 and the other end of spring 180 bears against bracket 184. An adjusting stop screw 186 is threaded through sleeve 182 and provided at the outer end thereof with a lock nut 188. Thus, with this arrangement the whole die assembly, including the lower shoe 140 and the upper shoe 144, is permitted to slide in a direction transversely to the path of travel of strip 120. This shuttling movement of the die assembly is limited in one direction by engagement of the die shoe 140 with the end of sleeve 178 and in the opposite direction by engagement of die shoe 140 with the end of screw 186.

The means for moving the die assembly to the shifted position shown by broken lines in Fig. 13 comprises a pneumatic cylinder 190, the piston rod 192 of which projects into sleeve 178 and is arranged to engage a plunger 194 in sleeve 178. Cylinder 190 is mounted on bolster plate 136 by a bracket 195. When compressed air is admitted to one side of the piston 202 in cylinder 190, the piston rod 192 is projected out of the cylinder, engages plunger 194 which in turn shifts the die assembly against the tension of compression spring 180 to a forwardly position wherein the lower die shoe 140 abuts against stop screw 186.

The means for controlling the shuttling movement of this die assembly comprises Cyclo-monitor 116. This Cyclo-monitor is adjusted so that after a predetermined number of revolutions a circuit through a solenoid 196 is closed through a switch 198. Solenoid 196 in turn operates a compressed air valve 200 for admitting pressure fluid to cylinder 190 behind the piston 202. Thus, every time Cyclo-monitor 116 actuates solenoid 196 the piercing die assembly 84 is shifted to the broken line position shown in Fig. 13. When this occurs the punches 164 are shifted transversely of the path of travel of strip 120 so that on the downstroke of ram 76 the strip 120 is bypassed by the punches and no perforations are formed in the strip on this particular stroke of the ram. Thus at predetermined spaced intervals along the strip an unperforated blank portion 204 is provided (Fig. 23). As soon as solenoid 196 is deenergized, valve 200 exhausts cylinder 190 and the piercing die assembly is returned by spring 180 to the position shown in solid lines in Fig. 13. The operation of the solenoid 196 is timed such that the die assembly will be shifted to the right, that is, to the position shown in Fig. 14, for only the duration of one complete stroke of ram 76.

*Notching die assembly*

After the strip is pierced by the punches 164, it is advanced in a step by step movement to the notching die assembly 86. This assembly includes a slide 206 arranged for sliding movement in a guideway 207 on bolster plate 136. Guideway 207 extends in a direction parallel to the path of travel of strip 120 through the press. Slide 206 is formed along the opposite longitudinal edges thereof with flanges 208. These flanges are engaged by gibs 210 to hold the slide 206 in the guideway 207. An adjusting screw 212 is journalled on a bracket 214 that is in turn secured to an end face of plate 136. Screw 212 is threaded into slide 206 as at 216 so that when the adjusting screw 212 is rotated in opposite directions the slide 206 is adjusted in a direction longitudinally of the strip 120.

A lower die shoe 218 is fixedly mounted on slide 206 as by screws 220. Shoe 218 has guide pins 222 thereon which guide an upper die shoe 224 for vertical movement. Gibs 226 are secured to the upper face of die shoe 224 to form a guideway 228 in which the lower flanged end 230 of a pin 232 is engaged. Guideway 228, it will be noted, extends in a direction longitudinally of strip 120. The upper end of pin 232 is threaded into ram 80 so that the shut height of the die can be adjusted by threaded adjustment of pin 232.

A die 234 is mounted on lower die shoe 218 by screws 235. Die 234 is formed with a cavity 236 in which is retained a multi-section die insert 237 provided with a pair of opposed die openings 238. On the upper face of die shoe 218 there is arranged a stripper plate 240, the underface of which is fashioned with a longitudinal slot 242 which forms a guideway for guiding strip 120. On the upper die shoe 224 there is mounted a pair of punches 244 which are aligned and correspond in shape with the die openings 238. The punches 244 and openings 238 are formed with opposed straight edges 246 provided with shallow offset portions 248. The straight edges 246 with the offset portions 248 are designed to form the notched portions 250 in the strip, leaving the accurately spaced lugs 50.

*Feed control mechanism*

With the arrangement described it will be observed that by means of the adjusting screw 212 the spacing between punches 164 and 244 can be very accurately adjusted. This adjustment is necessary to enable the proper spacing of vent openings 48 relative to the lugs 50. At the same time it will be appreciated that each successive increment of feed of strip 120 must be very accurately adjusted so that the proper spacing between the sets of vent openings 48 and the lugs 50 will be obtained. To obtain the fine feed adjustment that is required, the means illustrated in Figs. 4 to 9 are employed.

In Fig. 4 the jaws of the standard strip feeder 96 are shown diagrammatically at 252. Feeder 96 is adjusted to overfeed the strip 120. Just ahead of strip feeder 96 there is mounted on support 126 a spring return feed brake 253. This brake includes a block 254 secured to support 126. A pair of brackets 256 support guide rollers 258 for guiding the strip 120 from a supply coil into the press. A pair of horizontally extending, parallel guide pins in the form of studs 260 are threaded into block 254. These pins slidably support a brake block 262. Springs 263 bias brake block 262 rearwardly against the heads of studs 260. A brake shoe 264 is carried by brake block 262 and is guided for vertical movement thereon by studs 266. Brake block 262 and brake shoe 264 are provided with inserts 268, which may be made of Carboloy, for frictionally gripping the strip 120. A pressure plate 270 is supported on brake block 262 and is guided for vertical movement thereon by studs 272. Pressure plate 270 is biased downwardly toward brake block 262 by compression springs 274. An adjusting screw 276 threaded through pressure plate 270 bears against the top side of brake shoe 264. By adjusting screw 276, the gripping pressure of inserts 268 on strip 120 may be varied. Screw 276 is locked in place by a wing nut 278. The sliding movement of brake shoe 262 on studs 260 is limited in the feed direction by stop pins 280.

The means employed in combination with spring return feed brake 253 for accurately controlling the feed of the strip stock are shown in Figs. 4, 7, 8, 9 and 10. These means include a slide block 282 mounted at the delivery end of die shoe 218 as by screws 284 (Figs. 7 and 10). Block 282 is formed with a guideway 286 in which is arranged a slide 288. A screw mounting plate 290 is mounted on block 282. An adjusting screw 292 has one portion threaded through plate 290 as at 294 and a reduced portion threaded into slide block 288 as at 296. At its free end, the adjusting screw 292 is provided with a turning knob 298 having indicia thereon designating fractions of a thousandth of an inch. A pointer 301 on screw mounting plate 290 cooperates with the indicia on knob 298 to visibly indicate the position of adjustment of slide 288. The lead of the threaded portion 294 is different from the lead of the threaded portion 296 but both threads are of the same hand so that turning of knob 298 produces only a very slight longitudinal movement of slide 288 in guideway 286. As a matter of fact, the threaded portions 294 and 296 are designed so that one complete turn of knob 298 moves slide 288 about ten thousandths of an inch. The adjusted position of slide 288 is retained by a compression spring 300.

A control pawl 302 is pivotally supported on slide 288 as at 304. Pawl 302 is fashioned as a yoke and is mounted on slide 288 so that the two legs of the pawl that are pivotally connected to the slide as at 304 straddle the punched strip 120 passing therethrough. The pawl has a finger portion 306 overlying the strip 120. At its free end, finger 306 is provided with an insert 308 (Fig. 9) having a pair of depending detents 310 that are spaced apart to accommodate the strip 120 at the notched portion 250 (Fig. 18). The leading face of insert 308 is inclined as at 312. A spring 314 secured to the pawl 302 as by a screw 316 biases the pawl in a counterclockwise direction as viewed in Fig. 8 so that the insert 308 is urged downwardly into engagement with the punched strip.

The operation of the feed control mechanism described above is as follows: As pointed out previously, the jaws 252 of the strip feeder 96 overfeed the strip 120. As the strip 120 is advanced, the brake block 262 of the spring return feed brake 253 is shifted forwardly in the direction of feeding to a position wherein it abuts against stop pins 280 and springs 263 are compressed. After brake block 262 abuts against stop pins 280, additional feed causes strip 120 to slip between inserts 268. As the strip is fed forwardly, the inclined face 312 of insert 308 on pawl 302 engages the lugs 50 on the strip being fed to cam the pawl upwardly so that the lugs 50 move past the detents 310. At the end of the forward stroke of strip feeder 96, the lugs 50 have moved beyond the gripping faces of the detents 310, there being a clearance space 318 therebetween. When the jaws 252 move out of clamping engagement with the strip 120, the springs 263 shift the brake block 262 rearwardly; and since the strip 120 is frictionally engaged between the inserts 268 on the brake block 262 and the brake shoe 264, the strip 120 is also retracted. However, as soon as the strip 120 is retracted a distance corresponding to the clearance space 318, the lugs 50 of the strip are engaged by the detents 310 to hold the strip in this position against the tension of springs 263. Thus, the effective feed increment of strip 120 can be very accurately controlled by adjusting the knob 298. This adjustment, it will be appreciated, controls the spacing between the adjacent edges of successive lugs 50 and likewise the spacing between the adjacent pairs of vent openings 48.

Corrugating die assembly

After the strip is notched at the die assembly 86, it is advanced to the corrugating die assembly 88. The details of this die assembly are shown in Figs. 19 through 25. This die assembly includes a slide block 322 mounted on bedplate 138 of the press. Slide block 322 is formed with a guideway 324 on the upper face thereof in which is arranged for sliding movement a lower die shoe 326. A clamping plate 328 retains lower shoe 326 in guideway 324. Below guideway 324, slide 322 is formed with a slot 330 extending parallel to the guideway 324 which in turn is parallel to the longitudinal axis of the strip 120 fed through the machine. A rectangular sleeve 332 is slidably arranged in slot 330 and an adjusting screw 334 threadedly engages sleeve 332. Sleeve 332 is fashioned with a lug 336 engaging in a notch 338 on the lower face of die shoe 326. Screw 334 is journalled in a bracket 340 so that rotation of the screw in opposite directions causes lower die shoe 326 and upper die shoe 344 to move longitudinally in guideway 324 (Fig. 24).

A pair of upright pins 342 on lower die shoe 326 form guides for an upper shoe 344. A pair of gib plates 346 on the upper face of die shoe 344 form a guideway 348 in which is engaged the lower flanged end 350 of a pin 352. The upper end of pin 352 is threaded into ram 80 so that the shut height of the dies may be varied by threaded adjustment of pin 352. A punch 354 is mounted on upper die shoe 344 by a punch holder 356. The lower end of punch 354 is formed with a U-shaped notch 358. Notch 358 extends through punch 354 perpendicularly to the axis of strip 120. At each side of notch 358, the lower end of punch 354 is formed with a central flat face 360 and downwardly flared faces 362 on opposite sides thereof (Fig. 22). Lower die shoe 326 is formed with a longitudinally extending slot 364 in which a die block 366 is fixedly mounted. Within die block 366, there is arranged a die insert 368, a crimping or corrugating die 370 and a combined spring pad and die 372. The crimping die 370 is arranged between dies 368 and 372. The upper end of die insert 368 is provided with an anvil surface 374 (Fig. 22) which corresponds generally in contour with the face contour of the lower end of punch 354 on opposite sides of notch 358. The upper end face of die 372 is generally similarly shaped. However, the leading edge of die 372 is inclined as at 376. The die 372 is biased in an upward direction by a compression spring 378.

A stripper plate 380 is also mounted on die block 366. Stripper plate 380 is formed with an arched undersurface 382 terminating as at 383 at the delivery end of the die. Stripper plate 380 is formed with an opening 385 through which punch 354 extends. Adjacent the receiving end of the die, stripper plate 380 is fashioned with a guideway 384 for accommodating the free end of an auxiliary feed pawl 386. Die block 366 is formed with a groove 388 for guiding strip 120 and a brake plate 390 is biased downwardly into frictional engagement with strip 120 by compression springs 392.

Auxiliary feed mechanism

The auxiliary feed pawl 386 is eccentrically mounted as by a screw 394 on a hub 396. Hub 396 is journalled on an upright support 398 on the bedplate 138 of the press. A gear 400 on hub 396 meshes with a gear 402 at one end of a shaft 404. A sprocket 406 is mounted adjacent the other end of the shaft and is driven from countershaft 102 by chain drive 110 (Fig. 1). Pawl 386 is biased downwardly by a spring 412. As is shown in Fig. 20, the free end of auxiliary feed pawl 386 has an insert 414, the lower face of which is fashioned with a pair of spaced apart detents 416 between which extends a groove 418. The depth of groove 418 is slightly greater than the thickness of the strip stock 120, and the width of groove 418 corresponds generally to the width of the notched portion 250 of the strip.

Referring now to Fig. 1, it will be noted that the strip 120 bows upwardly as at 122 between die assemblies 86 and 88. This portion of the strip is maintained in the bowed condition by the brake plate 390 just ahead of the end of pawl 386. Brake plate 390 yieldably restrains advancement of strip 120 to die assembly 88. The stroke of pawl 386 is less than the feed stroke of strip feeder 96 as controlled by the micrometer adjusted pawl 302. However, the actuation of auxiliary feed pawl 386 is synchronized with the main feed because it is driven from the countershaft 102. The crimping or corrugating die assembly is adjusted by turning screw 334 so that at the end of its feed stroke, pawl 386 positions the strip 120 with the notched portion 250 and more specifically, the connecting portion 420 between the vent openings 48 in each pair (Fig. 18), center over the crimping die 370. Then, when the punch 354 descends, it engages the strip, holds it in this position and then continued downward movement thereof causes the strip to be pulled from both the delivery end of the die and from the feed end of the die to provide stock for forming the legs 46. In other words, the forming or corrugating die assembly is adapted to deform longitudinally spaced portions 46, 50 of the strip in a direction transversely of the plane of the strip and thereby contract the strip in length. On the feed stroke of pawl 386, the detents 416 move forwardly and engage the lugs 50 to advance the strip to the previously mentioned centered position. However, when the punch descends, the forming action described causes the lugs previously engaged by the detents 416 to advance in a direction away from the detents 416 while the pawl 386 is retracting. It will be observed that the spring pressed die 372 provides a means for stripping the formed corrugation from the upper end of die 370. In the uppermost position of die 372 (Fig. 24), the inclined face 376 thereof provides a ramp facilitating feed of the stock over the upper end of die 370. When punch 354 bottoms, the corrugation in the strip is fully formed; and at the same time, lugs 50 are bent downwardly as shown in Fig. 22.

*Induction heater*

After the strip is crimped at the die assembly 88, it advances to the induction heater 124. This heater comprises a copper tube, the intermediate portion of which is coiled as at 422 to form an induction heating element. The individual coils are either spaced apart or the tube itself is coated with an insulating material so that the successive convolutions are electrically insulated from one another. The ends 424 of the tube are electrically connected with a high frequency transformer and with a source of cooling water. A quartz or Vycor glass tube 426 extends longitudinally within the coiled tube 422 and electrically insulates the corrugated strip 120 from the copper tube. The coiled tube 422 is supported in axial alignment with the corrugated strip 120 by a pair of Micarta supports 428 which are in turn mounted on table 137 by brackets 430 and 432. A pair of electrically grounded brushes 434 are arranged to contact the corrugated strip 120 adjacent the opposite ends of the coiled tube 422 to ground the strip and thereby prevent pitting of the dies ahead of and beyond the induction heater. The induction heater in principle is of the conventional type wherein a high frequency current is caused to flow through the coiled tube 422 to heat the corrugated strip passing through the tube. The strip is heated to a temperature only sufficient to relieve the strains in the metal and the work hardening caused by the previous punching and cold forming operations.

*Coiling punch assembly*

After the corrugated strip 120 is stress relieved at the induction heater 124, it advances downstream in its path of travel through the press to the coiling punch assembly 90. This assembly includes a slide block 436 fixedly mounted on table 137. Block 436 is formed on the upper surface thereof with a guideway 438 in which is slidably mounted a lower die shoe 440. A clamp 442 holds shoe 440 in guideway 438. The top face of block 436 is formed with a rectangular slot 444 in which is slidably arranged an internally threaded sleeve 446. At one end, sleeve 446 is provided with an upwardly projecting lug 448 which engages in a recess formed in the bottom face of die shoe 440. An adjusting screw 450 is journalled on block 436 by a bracket 452. Screw 450 is in threaded engagement with sleeve 446 so that as the screw 450 is turned in opposite directions, the die shoe 440 is caused to move in a direction longitudinally of the direction of travel of strip 120 through the machine. An upper die shoe 454 is guided for vertical movement on lower die shoe 440 by a pair of guide pins 456. An anvil 458 is mounted on lower die shoe 440 and is provided with a supporting face 460 at the upper end thereof shaped to conform with the portion of the corrugated strip 120 provided with the lugs 50. A guide 462 is also mounted on shoe 440 for guiding the strip into position on anvil 458.

Upper shoe 454 is cut-away as at 464 to accommodate a floating punch block 466. Punch block 466 is supported on upper shoe 454 by a pair of depending brackets 468 and is guided for movement between brackets 468 by a guide plate 470. With this arrangement, punch block 466 is permitted to shift in a direction longitudinally of the direction of travel of the corrugated strip 120. A coiling punch 472 is mounted in punch block 466. The lower end of punch 472 has converging flat faces 474. A plunger 476 within punch 472 is biased downwardly by a spring 478 so that the lower end of the plunger projects downwardly through the lower end of punch 472 and provides a spring biased pressure pad 480.

The means for actuating punch 472 are best illustrated in Fig. 1. A horizontally extending shaft 482 is journalled adjacent opposite ends in bearing blocks 484 and 486. At one end, shaft 482 is provided with a crank arm 488 and at its opposite end with a crank arm 490. The end of crank arm 488 is engaged by a pin 492 which is threaded into the lower end of ram 80. Pin 492 is provided with a handle 494 for adjusting the pin while the press is in operation. Crank 490 at its free end bears against a pad 496 on the upper die shoe 454 of the coiling punch assembly 90. Cranks 488 and 490 as viewed in Fig. 1 project forwardly in a generally horizontal plane from shaft 482. Thus, when ram 80 descends, pin 492 engages crank 488 to pivot shaft 482 and thus cause crank 490 to drive the upper shoe 454 and the punch 472 mounted thereon downwardly toward the portion of strip 120 supported on anvil 458. The pressure pad 480 is thus brought to bear against the portion of strip 120 on the anvil face 460 and the converging flat faces 474 engage the legs 46 of the strip and flare them away from one another, thus imparting a curvature to the strip as it leaves the die and forming the strip into a coil 497. The amount of flare, and thus the diameter of the coil into which the strip is formed, is determined by the lowermost position of punch 472. This in turn is controlled by the adjustment of pin 492. Thus, if it is desired to produce less curvature in the strip, pin 492 is threaded upwardly into ram 80 so that the downward stroke of punch 472 is shortened. Die springs 498 are arranged between the upper and lower die shoes.

Punch block 466 is mounted for floating movement on upper die shoe 454 so that it will automatically center itself between the legs 46 of the section of strip 120 on anvil 458. The location of the portion of the corrugated strip 120 provided with the lugs 50 on the anvil face 460 will vary when the machine is initially set into operation. After the machine has been in operation for a relatively short period of time, equilibrium conditions are obtained with reference to the heating of the strip in the induction coil 422; and the position of the portion of the strip being flared by the punch 472 remains relatively constant. At any given instant, if the punch 472 is not centrally located with respect to the legs 46 of the corrugated strip, as the punch descends, either one or the other of the inclined faces 474 will engage one of the legs 46 and shift the block 466 to a centrally disposed position.

*Cut-off mechanism*

After the corrugated strip is coiled as described above, it is cut into the rings 40 by the cut-off mechanism 118. This cut-off mechanism includes a base plate 500 (Figs. 1 and 33) mounted on table 137 by cap screws 502. Plate 500 is provided with elongated openings 504 which permit adjustment of plate 500 in a direction toward and away from the coiling punch assembly 90. This adjustment is effected by an adjusting screw 506 journalled in a depending bracket 508 at the end of plate 500. The free end of screw 506 is threaded into table extension 510. A support plate 512 is welded to base plate 500 in an upright position (Fig. 33). A slide plate 514 is mounted on the front face of upright plate 512 by means of cap screws 516 passing through vertically elongated openings 518 in slide plate 514 and threaded into plate 512. While the screws 516 are loose, vertical adjustment of slide plate 514 on plate 512 is enabled by an adjusting screw 520 provided with a knob 522 at the upper end thereof and threaded into a threaded vertical opening 524 in plate 512. Screw 520 is supported on the backside of slide plate 514 by a bracket 526.

Slide plate 514 has an angular extension 528 at the upper end thereof. A ram guide 530 is adjustably mounted on the front face of extension 528 by cap screws 532. Ram guide 530 extends generally radially of the coil 497 into which the strip stock is formed by the coiling punch assembly 90. The holes 534 in extension 528 through which the screws 532 extend are elongated in a direction radially of the coiled strip 497. Adjustment of the ram guide 530 radially of the coil 497 is effected by an adjusting screw 536 journalled on a bracket 538 and threaded into the upper end of ram guide 530 as at 540. Ram guide 530 is fashioned with a guideway 542 in which is slidably arranged a ram 544. At its lower end, ram 544 supports a cut-off punch 546. A slotted cut-off die 548 is mounted on ram guide 530 in alignment with cut-off punch 546. Ram 544 is retained in guideway 542 by a cover plate 550 secured to guide 530 by screws 551. At its upper end, ram 544 is provided with a pair of spaced lugs 552 between which is engaged the rounded end 554 of a bell crank 556. Crank 556 is pivotally supported as at 558 on slide plate 514 by a bracket 560. The other end of crank 556 is connected with a solenoid 562 (Fig. 1). When the solenoid is energized, crank 556 is pivoted in a clockwise direction, thus causing punch 546 to travel into the slotted cut-off die 548 and shear through the coil 497 at the blank portion 204, Fig. 23. When the solenoid is deenergized, crank 556 is rotated in a counterclockwise direction by a compression spring 564 to retract punch 546. Spring 564 surrounds a plunger 566 which is connected at its upper end to crank 556 by a pin 568 and the lower end of the plunger extends through a bracket 570 on slide plate 514.

A channel shaped guide member 572 at the end of an arm 576 is adjustably mounted on the top face of ram guide 530 by a screw 574. Arm 576 is slotted longitudinally as at 578 so that the guide 572 can be pivoted about screw 574 and can be shifted in a direction generally radially of the coiled strip. In forming coil strip 497, it is important that the free end of the coil not interfere with the coiling punch assembly 90 and the operation of the cut-off punch 546. Thus, the cut-off assembly 118 is located in a vertical plane spaced slightly forwardly of the coiling punch 472 and the anvil 458. The guide 572 is adjusted to impart a slight twist to the corrugated strip so that it will spiral axially. The extent of this twist is determined by the position of guide 572.

As mentioned previously, the operation of cut-off mechanism 118 is controlled by Cyclo-monitor 114. For example, if the ring 40 being formed has thirty-four corrugations 44 therein, Cyclo-monitor 114 would be adjusted to energize solenoid 562 once every thirty-four strokes of the press. The particular stroke of the press at which the cut-off mechanism 118 is energized corresponds to the advancement of the blank portion 204 of the corrugated strip to a position in alignment with the cut-off punch 546. Thus, when the punch 546 is actuated, the blank portion 204 is completely sheared from the corrugated strip, leaving ends 580 on the ring 40 which, due to the resilience of the ring, abut one another.

*Skip switch mechanism*

As previously noted, the cut-off mechanism 118 is triggered by the electrical impulses produced by Cyclo-monitor 114. In order to insure a full and properly timed stroke of the cut-off punch 546, it is desirable to correlate the electrical impulses of Cyclo-monitor 114 with the stroke of the press. The means provided for accomplishing this are referred to herein as a skip switch mechanism, generally designated 582 in Fig. 1. These means include a support bracket 584 mounted on the frame of the press. A solenoid 586 on bracket 584 has connected to it the leads from Cyclo-monitor 114. The armature of solenoid 586 has a rod 588 connected to it. Rod 588 connects with one end of a bell crank 590 which is pivotally supported on bracket 584 as at 592. The other end of bell crank 590 carries a rocker arm 594.

One end of rocker arm 594 engages a limit switch 596 that is arranged to close the circuit to the cut-off solenoid 562. When solenoid 586 is energized, rod 588 is pulled up to shift rocker arm 594 to the position illustrated in Fig. 1 wherein its other end is in the path of travel of an adjusting screw 598 on the end of an arm 600 mounted to travel with ram 80. Cyclo-monitor 114 is set to the required number of press strokes per cut-off. At the required stroke, solenoid 586 is energized to seat the shifting rocker arm 594 under screw 598. As the ram 80 approaches the lower limit of its stroke, rocker arm 594 closes limit switch 596 to energize the cut-off solenoid 562. The proper stroke of the cut-off punch 546 is thus obtained.

A safety switch 602 is arranged on the press at the bowed portion 122 of strip 120 (Fig. 1). Switch 602 is of standard construction and comprises a pair of limit switches provided with vertically shiftable plungers arranged above and below a portion of the strip 120 at the bow 122. If the bow 122 increases in size, that is, there is an excess of strip material due to a faulty operation beyond the bow, the upper limit switch is actuated; and if the bow decreases in size, that is, there is a shortage of material because of lack of feed through die assemblies 84 and 86, the lower limit switch of safety switch 602 will be actuated. These limit switches are arranged to open the main circuit of the machine and thus stop all the operations and cause brake 68 to seize crankshaft 64. Since the flywheel 58 is connected with crankshaft 64 through the positive drive clutch 62 with electric throw-out, it will be appreciated that the rotation of crankshaft 64 can be immediately stopped.

As is apparent, one of the desirable features of the press is that the ring 40 is completely formed in a single continuous operation. The adjustment features provided enable rings of different diameters to be formed without changing any dies. Changing of dies is required only when it is desired to produce a ring of different width. A change in the diameter of the ring can be effected by the adjustments provided on the press. For example, let us assume that the ring formed has thirty-four corrugations and it is desired to increase the diameter of the ring to an extent that requires an additional thirty-four thousandths in the length of the strip stock for each ring. This added length is obtained by adjusting the differential screw 292 so that the detents 310 of the feed control pawl 302 are advanced in the direction of feed one thousandth of an inch. Thus, during each stroke of the machine, the feed of strip 120 will be increased by a thousandth of an inch and the lugs 50 will be one thousandth of an inch longer. Since the auxiliary feed pawl 386 feeds the strip stock to the corrugating die assembly 88 by engaging the lugs 50, no adjustment of the corrugating die assembly 88 is required. The only other adjustment that may be necessary is that of screw 492 which controls the stroke of coiling punch 472. When the diameter of the ring is increased, it may be necessary to reduce slightly the stroke of punch 472 so that the amount of divergence of the legs 46 of the ring is reduced.

If the diameter of a ring having thirty-four corrugations is to be increased an amount that will accommodate an additional corrugation in the ring, then the Cyclo-monitors 114 and 116 are set to actuate the shuttle mechanism for die assembly 84 and the cut-off mechanism 118 once every thirty-five strokes rather than every thirty-four strokes. If any adjustment in feed is required, this can be effected through rotation of the differential adjusting screw 292 which accurately controls the position of the feed pawl 302.

If the amount of feed is varied considerably by means of differential screw 292, then it may be necessary to shift notching die assembly 86 lengthwise of the strip so that the notched portion 250 will be properly located with respect to each pair of vent openings 48. This adjustment of notching die assembly 86 is controlled by adjusting screw 212.

If the diameter of the ring being formed is changed considerably, an adjustment in the position of the cut-off mechanism 118 is required. As pointed out previously, the cut-off punch 546 and die 548 are positioned so as to be aligned with the blank portion 204 of the corrugated strip. Naturally, a substantial change in the size of the ring will result in the blank portion 204 (Fig. 23) being located in a different position relative to the cut-off punch. The whole cut-off assembly can be shifted lengthwise of the press by loosening screws 502 and turning screw 506. The vertical position of the cut-off mechanism may be varied by loosening screws 516 and turning knob 522. At the same time, the closed position of the cut-off punch and die may be adjusted by screw 536.

We claim:

1. In a press for punching a continuous length of strip stock, the combination comprising a die assembly including a punch and a die, means for reciprocating the punch to perforate the strip, means timed with the reciprocation of the punch to feed a length of the strip stock between the punch and die with a step by step movement, said strip feed means being arranged to feed the strip an increment greater than the desired distance between centers of the successive perforations made by the punch, means biased in a direction opposite to the feed direction of the strip and tending to retract the strip after it has been fed forwardly by said feed means and stop means positioned beyond the punch in the direction of travel of the strip and engageable with a perforated edge portion of the strip to limit the position to which said biased means retract the strip.

2. The combination set forth in claim 1 wherein said stop means are adjustable longitudinally of the path of travel of the strip through the die assembly.

3. The combination set forth in claim 1 wherein said die assembly comprises an upper shoe supporting the punch and a lower shoe supporting the die, said stop means being supported on said lower shoe and being adjustable longitudinally of the path of travel of the strip through the die assembly.

4. The combination set forth in claim 1 wherein said biased means comprises a pair of gripping members frictionally engaging the strip in advance of the die assembly and including means for varying the gripping force of said members on the strip to permit said gripping members to slip relative to the strip when the perforated edge portion of the strip is engaged by said stop means.

5. In a press for punching a continuous length of strip stock, the combination of a die assembly including a punch and a die, means for reciprocating the punch to perforate the strip, a strip feeder for advancing the strip through the die assembly in successive increments greater than the desired distance between centers of the successive perforations made by the punch, means synchronizing the operation of the strip feeder with the reciprocation of said punch so that the strip is fed said increment during a portion of said reciprocation of the punch, means positioned in the path of travel of the strip in advance of said die assembly and strip feeder for yieldably gripping the strip being fed to the die assembly, said gripping means being movable longitudinally of the direction of travel of the strip through the die assembly and normally tending to retract the strip and a stop member located on the delivery side of said die assembly in the path of travel of the strip and arranged to engage a perforated edge portion of the strip which extends transversely of the direction of travel of the strip to positively locate the position to which the strip is retracted by the gripping means.

6. The combination set forth in claim 5 wherein said strip feeder is located in the path of travel of the strip in advance of said die assembly.

7. The combination set forth in claim 5 wherein said stop means comprises a movable pawl having a portion biased to move into a perforated portion of the strip to engage said perforated edge portion when the strip is retracted.

8. The combination set forth in claim 7 wherein said pawl has an inclined face at the end thereof disposed toward said die assembly for camming the pawl out of the perforated portion of the strip when the strip is advanced in the feed direction.

9. The combination set forth in claim 7 wherein the pawl is mounted on a slide movable longitudinally of the path of travel of the strip.

10. The combination set forth in claim 9 wherein said slide is mounted on a support fixed relative to the die assembly and including an adjusting screw interconnecting said support and said slide for adjusting the position of the pawl lengthwise of the path of travel of the strip.

11. The combination set forth in claim 10 wherein said screw is designed to produce micrometer type adjustment of said slide.

12. In a press for punching a continuous length of strip stock, the combination comprising a die assembly including a punch and a die, means for reciprocating the punch to perforate the strip, means timed with the reciprocation of the punch to feed a length of the strip stock between the punch and the die with a step by step movement, said strip feed means being arranged to feed the strip an increment greater than the desired distance between centers of the successive perforations made by the punch, a pair of brake members in advance of the die assembly and arranged one against each of the opposite faces of the strip, means biasing said brake members toward each other to cause the brake members to yieldably grip the strip, said brake members being movable as a unit longitudinally of the path of travel of the strip and being biased to move in a direction opposite to the feed direction of the strip and stop means positioned beyond the punch in the path of travel of the strip and engageable with a perforated edge portion of the strip to positively locate the position to which said brake members retract the strip.

13. The combination set forth in claim 12 wherein said brake members are located in advance of said strip feeding means.

14. The combination set forth in claim 12 including a support slidably mounting one of said brake members for movement in a direction parallel to the path of travel of the strip, the other brake member being mounted on the last mentioned brake member for movement toward and away therefrom, a bar overlying said other brake member and having an adjusting screw thereon engaging said other brake member, said first mentioned biasing means comprising spring means acting on said bar and urging said screw against said other brake member, said screw being adjustable to vary the tension of said spring means.

15. In a press for punching a continuous length of strip stock, the combination of a first die assembly including a punch and a die for producing one set of perforations in the strip, a second die assembly for producing another set of perforations in the strip, means aligned with said two die assemblies for feeding a length of strip stock successively through said two die assemblies in successive increments greater than the desired distance between centers of successive perforations in each set, means positioned in the path of travel of the strip and in advance of said die assemblies yieldably engaging the strip and tending to move the strip in a direction opposite to the feed direction of the strip, stop means in the path of travel of the strip and located beyond the second die assembly, said stop means being arranged to engage with a perforated edge portion of the strip to positively locate the position to which the strip is retracted by said strip engaging means, means for accurately adjusting said stop means and one of said die assemblies relative to the other in a direction longitudinally of the path of travel of the strip whereby the distance between centers of each set of perforations and the relative positions of the two sets of perforations on the strip can be accurately adjusted.

16. The combination set forth in claim 15 wherein said two die assemblies are mounted on a common base, one of said die assemblies being fixed on said base relative to the feed direction of the strip and the other being movable on the base longitudinally of the path of travel of the strip and a screw interconnecting said base and said last mentioned die assembly for adjusting the position of the last mentioned die assembly relative to the other die assembly.

17. In a press for punching a continuous length of strip stock, the combination of a die assembly having a lower shoe supporting a die and an upper shoe mounted on the lower shoe for vertical movement thereon and supporting a punch cooperable with said die to punch the portion of the strip between the die and the punch, power means for vertically reciprocating said upper shoe, a support for the lower shoe having a rectilinear guideway therein, means timed in operation with said punch for shifting the die assembly from one position in the guideway to another position in the guideway at predetermined intervals corresponding to a plurality of strokes of the punch, means on said support adjacent the die assembly forming a guideway for the strip stock, said last mentioned guideway extending generally perpendicularly to the first mentioned guideway and being arranged to guide the strip stock between said shoes in the path of travel of the punch when the die assembly is disposed in said one position and means timed with the reciprocation of said punch for feeding strip stock through the guideway a predetermined distance during each stroke of the punch.

18. In a press for punching a continuous length of strip stock, the combination of a die assembly having a lower shoe supporting a die provided with an opening therein and an upper shoe supported on the lower shoe for vertical movement thereon and supporting a punch cooperable with said die opening to punch the portion of the strip between the die and the punch, power means for vertically reciprocating said upper shoe, means forming a guideway for guiding strip stock through the die assembly, a feed mechanism for feeding strip stock through said guideway with a step by step movement timed with the stroke of the punch and means for shifting said die assembly in a direction generally perpendicular to said guideway from a position where the path of travel of the punch is aligned with the strip in the guideway to a position where the path of travel of the punch is offset from the strip in the guideway, said last mentioned means being timed in relation to the reciprocation of the punch to shift said die assembly to the last mentioned position at regular intervals corresponding to a plurality of strokes of the punch.

19. The combination set forth in claim 18 including means for varying the duration of said intervals so that the number of strokes of the punch between successive shifting movements of the die assembly can be controlled.

20. The combination set forth in claim 18 including a support having a guideway therein extending generally perpendicularly to said first mentioned guideway, said die assembly being slidably mounted in the second mentioned guideway, said last mentioned means comprising a pneumatic cylinder member and a piston member movable therein, one of said members being fixed relative to said support and the other being connected with said die assembly whereby the die assembly is shifted in said second mentioned guideway in response to relative movement between the piston and cylinder members, a valve controlling the admission of compressed air to said cylinder member on one side of said piston member, a solenoid for controlling the operation of said valve and means operatively associated with said punch reciprocating means for closing an electrical circuit to said solenoid at said regular intervals.

21. The combination set forth in claim 20 including means biasing said die assembly in said second mentioned guideway to return the die assembly to said one position after said solenoid is deenergized.

22. The combination set forth in claim 18 including a cut-off mechanism in the path of travel of the strip beyond said die assembly and means for operating said cut-off mechanism at regular intervals corresponding generally in duration with said first mentioned intervals, said cut-off mechanism being located in said path of travel such that when operated, it shears said strip at the blank space therein resulting from the shifting of the die assembly to said second position.

23. In a press for forming strip stock into corrugated rings, the combination comprising a forming die assembly, a means for feeding strip stock with a step by step movement through said forming die assembly, said forming die assembly being adapted to form successive, generally U-shaped corrugations in the strip and a coiling die assembly located in the path of travel of the strip downstream from the forming die assembly, said coiling die assembly including an anvil member on which the bight portions of said corrugation are successively located, a reciprocating punch movable toward and away from the portion of the corrugated strip seated on said anvil, said punch having a resilient pressure pad at the leading end thereof adapted when moved toward the corrugation to firmly hold the bight portion of the corrugation on said anvil member and a nose member having side faces converging toward said pressure pad, said side faces of said nose being adapted to engage the legs of the corrugation seated on said anvil member remotely from the bight portion thereof and bend said legs apart adjacent their connection with the bight portion and thereby impart a curvature to the corrugated strip.

24. The combination set forth in claim 23 including means for varying the stroke of the punch in a direction toward the corrugated strip to thereby vary the extent to which said legs are bent apart and consequently the radius of curvature of the strip.

25. In a punch press, the combination comprising a die assembly including a punch and a die, a reciprocating ram for operating the punch, a feed mechanism for feeding strip material between the punch and die with a step by step movement, said feed mechanism being timed in operation with the ram so that the strip is formed by said punch between each successive increment of feed, a cut-off mechanism, a solenoid adapted when energized to operate said cut-off mechanism and means for energizing said solenoid at regular intervals corresponding to a plurality of strokes of the ram comprising a second solenoid, means timed in operation with the ram for closing a circuit through said second solenoid as regular intervals, a normally open switch connected with said first solenoid to energize the same when closed and a closing mechanism for said switch shiftable by said second solenoid from an inoperative position to a position operated by said ram when the ram approaches one end of its stroke.

26. The combination set forth in claim 25 wherein said switch closing mechanism includes a switch arm for closing said switch, said switch arm being pivotally supported on a shiftable support, said support being shifted by the second solenoid and said arm in the switch closing position being engaged by means movable with the ram when the ram approaches one end of its stroke.

27. In a press for forming strip stock into corrugated rings, the combination comprising a main feed mechanism for feeding strip stock with a step by step movement past a plurality of stations, a die assembly at one of said stations including a punch and a die for forming perforations in the strip between each successive increment of feed, means at a successive station for forming successive, generally U-shaped corrugations in the perforated strip, means yieldably restraining the movement of the perforated strip freely to said corrugating means and causing said strip to assume a bowed shape between the first and second mentioned stations, an auxiliary feed mechanism between the first and second mentioned stations timed in operation with said main feed mechanism and arranged to feed said perforated strip from said bowed portion to said corrugating means, said main feed mechanism producing an increment of feed of the strip which corresponds in length with the desired spacing of the successive perforations formed in the strip at said first station, means at a third station successive to the second station for spreading the legs of each U-shaped corrugation apart whereby to form said corrugated strip into a coil, a cut-off mechanism for shearing said coiled strip into rings, means for adjusting the main feed mechanism to vary the spacing of successive perforations and means for adjusting said spreading means to vary the diameter of the coil being formed.

28. In a press for forming strip stock into corrugated rings, the combination comprising a main feed mechanism for feeding strip stock with a step by step movement past a plurality of stations, a die assembly at one of said stations including a punch and a die for forming perforations in the strip between each successive increment of feed, a die asembly at a successive station including a punch and a die for forming successive, generally U-shaped corrugations in the perforated strip, means adjacent the second mentioned die assembly yieldably restraining movement of the perforated strip freely to said corrugating die assembly and causing said strip to assume a bowed shape between the first and second mentioned stations, an auxiliary feed mechanism adjacent said restraining means, said auxiliary feed mechanism including a pawl and means for reciprocating the pawl through a predetermined stroke in the path of travel of the strip, said pawl on the forward movement thereof engaging a perforated edge portion of the strip to feed strip material from said bowed portion and thereby advance the strip past said restraining means to properly locate the perforations therein relative to the corrugating die assembly, means at a third station successive to the corrugating station for spreading the legs of each U-shaped corrugation apart whereby to form said corrugated strip into a coil, a cut-off mechanism for shearing the coiled strip into rings, means for adjusting the main feed mechanism to vary the spacing between successive perforated edge portions and means for adjusting said spreading means to vary the diameter of the coil being formed.

29. The combination set forth in claim 28 wherein said cut-off mechanism is disposed generally radially relative to the ring being formed at said coiling station and means for adjusting said cut-off mechanism both radially and circumferentially of the coil being formed at said coiling station.

30. The combination set forth in claim 28 wherein said corrugating die assembly includes a punch and a die arranged to engage opposite sides of the strip to thereby bend a portion of the strip into said corrugation and by said bending draw strip material from said bowed portion past said restraining means.

31. The combination set forth in claim 30 wherein the stroke of said pawl is controlled in length such that the pawl moves forwardly through a portion of its stroke before it engages said perforated edge portion.

32. The combination set forth in claim 31 wherein said auxiliary feed mechanism and said corrugating die assembly are relatively movable lengthwise of the path of travel of the strip to permit adjustment of the location of the perforations in the strip at said corrugating die assembly relative to said punch and die.

33. In a press for punching and forming a continuous length of strip stock at regularly spaced intervals, the combination comprising a support, a die assembly on said support for perforating said strip, a second die assembly on the support for forming said strip, said forming die assembly being spaced beyond said perforating die assembly in the path of travel of the strip through the press, a main feed mechanism for feeding strip stock through said perforating die assembly with a step by step movement in increments corresponding to the desired spacing between the successive perforations formed by said perforating die assembly, said forming die assembly being adapted to deform longitudinally spaced portions of the strip in a direction transversely of the plane of the strip and thereby contract the strip in length, means yieldably restraining movement of said strip freely through the forming die assembly and thereby causing the strip to assume a bowed shape between said two die assemblies, and an auxiliary feed mechanism between said two die assemblies timed in operation with the main feed mechanism and arranged to overcome the restraining action of said last mentioned means on said strip to feed strip stock with a step by step movement past said restraining means to said forming die assembly in an increment different from the increment of feed produced by said main feed mechanism.

34. The combination set forth in claim 33 wherein said auxiliary feed mechanism includes a pawl, means for reciprocating said pawl through a predetermined stroke along the path of travel of the strip between said two die assemblies, said pawl on the feed stroke thereof moving forwardly to abut against an edge portion of the strip produced by the perforating die assembly to feed the strip to said forming die assembly.

35. The combination set forth in claim 33 wherein said forming die assembly is designed to produce corrugations in the strip and thereby draw strip stock from said bowed portion thereof, said restraining means being located between the two die assemblies and adjacent the downstream end of said bowed portion.

36. The combination set forth in claim 33 wherein the distance through which the stock is fed by said auxiliary feed mechanism is less than the distance through which the stock is fed by said main feed mechanism.

37. In a press for punching and forming a continuous length of strip stock at regularly spaced intervals, the combination comprising a support, a die assembly on said support for perforating said strip, a second die assembly on the support for forming said strip, said forming die assembly being spaced beyond said perforating die assembly in the path of travel of the strip through the press, a main feed mechanism for feeding strip stock through said perforating die assembly at a predetermined feed rate, means for operating said forming die assembly intermittently to deform longitudinally spaced portions of the strip stock in a direction transversely of the plane of the strip and thereby contract it in length, means resiliently restraining movement of the strip stock freely from said perforating die assembly through said forming die assembly and thereby causing the strip stock to assume a bowed condition between said two die assemblies, an auxiliary feed mechanism between said two die assemblies timed in operation with said forming die assembly and engageable with the strip stock to overcome the bias of said restraining means and thereby feed strip stock from bowed section past said restraining means to said forming die assembly with a step by step movement and at a rate different from the feed rate of said main feed mechanism.

38. In a press for punching a continuous length of strip stock, the combination comprising a die assembly including a punch and a die, means for reciprocating the punch to perforate the strip, means timed with the reciprocation of the punch to feed a length of the strip stock between the punch and die with a step by step movement, said strip feed means being arranged to feed the strip an increment greater than the desired distance between centers of the successive perforations made by the punch, means for retracting the strip after it has been fed forwardly by said feed means, and stop means positioned beyond the punch in the direction of travel of the strip and engageable with a perforation formed in said strip by said punch to limit the position to which said retracting means retract the strip.

39. In a press for punching a continuous length of strip stock, the combination of a die assembly having upper and lower shoes, one of said shoes supporting a punch and the other supporting a die cooperable with the punch to punch the portion of the strip between the punch and die, means for vertically reciprocating one of the shoes relative to the other, a support for the last mentioned shoe having a guideway therein, means timed in operation with the reciprocation of said one shoe for shifting the die assembly from one position in said guideway to another at predetermined intervals, means fixed relative to said support and forming a guideway for the strip stock, said last mentioned guideway extending transversely of the first mentioned guideway and being arranged to guide the strip stock between said shoes in the path of travel of the punch when the die assembly is disposed in said one position and out of the path of travel of the punch when the die assembly is disposed in said other position, and means timed with the reciprocation of the punch for feeding strip stock through the second mentioned guideway a predetermined distance during each stroke of the punch.

40. In a press for forming strip stock into corrugated rings, the combination comprising a main feed mechanism for feeding strip stock with a step by step movement past a plurality of stations, a die assembly at one of said stations including a punch and a die for forming perforations in the strip between each successive increment of feed, means at a successive station for forming successive, generally U-shaped corrugations in the perforated strip, means yieldably restraining the movement of the perforated strip freely to said corrugating means and causing said strip to assume a bowed shape between the first mentioned and second mentioned stations, an auxiliary feed mechanism between the first and second mentioned stations timed in operation with said main feed mechanism and arranged to feed said perforated strip from said bowed portion to said corrugating means, said main feed mechanism producing an increment of feed of the strip which corresponds in length with the desired spacing of the successive perforations formed in the strip at said first station, means at a third station successive to the second station for spreading the legs of each U-shaped corrugation apart whereby to form said corrugated strip into a coil, means for adjusting the main feed mechanism to vary the spacing of successive perforations and means for adjusting said spreading means to vary the diameter of the coil being formed.

41. In a press for forming strip stock into corrugated rings, the combination comprising a forming die assembly, a means for feeding strip stock with a step by step movement through said forming die assembly, said forming die assembly being adapted to form successive, generally U-shaped corrugations in the strip and a coiling die assembly located in the path of travel of the strip downstream from the forming die assembly, said coiling die assembly including a reciprocating punch movable toward and away from the corrugated strip and engageable with and between the adjacent legs of each U-shaped corrugation to spread them apart at one end thereof and thereby impart a curvature to the corrugated strip, said punch having an end portion of decreasing transverse dimension in a direction toward the free end thereof, said coiling die assembly including a punch holder, said punch being floatingly mounted on said punch holder for movement in a direction parallel to the path of travel of the strip whereby the punch centers itself with respect to each corrugation by engagement of the end portion thereof with the legs of the corrugation.

References Cited in the file of this patent
UNITED STATES PATENTS

| | | |
|---|---|---|
| 691,883 | Zucker | Jan. 28, 1902 |
| 734,215 | Bilgram | July 21, 1903 |
| 978,598 | Knaus | Dec. 13, 1910 |
| 1,259,359 | Carr | Mar. 12, 1918 |
| 1,546,195 | Briskin | July 14, 1925 |
| 1,741,905 | Beck | Dec. 31, 1929 |
| 2,026,413 | Binns | Dec. 31, 1935 |
| 2,243,351 | Lowry | May 27, 1941 |
| 2,296,488 | Anderson | Sept. 22, 1942 |
| 2,339,538 | Zahodiakin | Jan. 18, 1944 |
| 2,353,925 | Pattison | July 18, 1944 |
| 2,371,816 | Frank | Mar. 20, 1945 |
| 2,374,376 | Olney | Apr. 24, 1945 |
| 2,443,377 | Daniel | June 15, 1948 |
| 2,697,865 | Norton | Dec. 28, 1954 |
| 2,742,279 | Small | Apr. 17, 1956 |
| 2,815,061 | Annen | Dec. 3, 1957 |

UNITED STATES PATENT OFFICE
CERTIFICATE OF CORRECTION

Patent No. 2,925,847                                                  February 23, 1960

Leo C. Burns et al.

It is hereby certified that error appears in the printed specification of the above numbered patent requiring correction and that the said Letters Patent should read as corrected below.

Column 4, line 6, for the patent number "1,959,953" read -- 1,959,853 --; line 58, for "algined" read -- aligned --.

Signed and sealed this 9th day of August 1960.

(SEAL)
Attest:

KARL H. AXLINE                                            ROBERT C. WATSON
Attesting Officer                                          Commissioner of Patents